United States Patent
Nakamura

(10) Patent No.: US 7,523,028 B2
(45) Date of Patent: Apr. 21, 2009

(54) METHOD OF AND SYSTEM FOR SIMULATING A LIGHT-EMITTING DEVICE

(75) Inventor: Hajime Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/877,081

(22) Filed: Oct. 23, 2007

(65) Prior Publication Data
US 2008/0133188 A1   Jun. 5, 2008

(30) Foreign Application Priority Data
Nov. 30, 2006   (JP) .............................. 2006-323959

(51) Int. Cl.
*G06F 17/50* (2006.01)
*G06G 7/62* (2006.01)

(52) U.S. Cl. .......................... 703/13; 136/263; 348/82; 348/99; 313/498; 313/504

(58) Field of Classification Search ................... 703/13
See application file for complete search history.

(56) References Cited

U.S. PATENT DOCUMENTS

| | | | | |
|---|---|---|---|---|
| 6,327,554 | B1 * | 12/2001 | Kobori ........................ | 703/5 |
| 6,451,415 | B1 * | 9/2002 | Forrest et al. ............... | 428/212 |
| 7,098,589 | B2 * | 8/2006 | Erchak et al. ............... | 313/498 |
| 7,245,074 | B2 * | 7/2007 | Shiang ........................ | 313/504 |
| 2004/0031966 | A1 * | 2/2004 | Forrest et al. ............... | 257/79 |

FOREIGN PATENT DOCUMENTS

| | | |
|---|---|---|
| JP | 7-281980 A | 10/1995 |
| JP | 11-136274 A | 5/1999 |
| JP | 2002-318739 A | 10/2002 |
| JP | 2003-348113 A | 5/2003 |
| JP | 2003-289338 A | 10/2003 |
| JP | 2004-006755 | 1/2004 |
| JP | 2006-278035 A1 | 10/2006 |
| JP | 2006277987 | 10/2006 |
| JP | 2006278035 | 10/2006 |

(Continued)

OTHER PUBLICATIONS

Bulovic et al, "Exciton Physics in Organic Optoelectronics", Progress Report of the Research Library of Microelectronics, No. 146, Massachusetts Institute of Technology, Chapter 26, section III, 2003-2004.*

(Continued)

*Primary Examiner*—Paul L Rodriguez
*Assistant Examiner*—Mary C Jacob
(74) *Attorney, Agent, or Firm*—Dillon & Yudell LLP

(57) ABSTRACT

A method for simulating characteristics of a light-emitting device by calculating optical and electrical properties of the light-emitting device includes steps of calculating a concentration of excitons in the light-emitting device and calculating data sets including a first data set comprising a light extraction efficiency, a second data set comprising a total emission power factor of excitons, a third data set comprising a photometric quantity and a fourth dataset comprising an emission power factor and a power reflector. The method further includes calculating a device characteristic of the light-emitting device in a measurable dimension.

3 Claims, 17 Drawing Sheets

FOREIGN PATENT DOCUMENTS

| | | |
|---|---|---|
| JP | 2007-95500 A1 | 4/2007 |
| JP | 2007095500 | 4/2007 |
| JP | 2006-277987 A1 | 4/2008 |

OTHER PUBLICATIONS

Hung et al, "Recent Progress of Molecular Organic Electroluminescent Materials and Devices", Materials Science and Engineering R 39, pp. 143-222, 2002.*

Peumans et al, "Small Molecular Weight Organic Thin-Film Photodetectors and Solar Cells", Journal of Applied Physics, vol. 93, No. 7, Apr. 1, 2003.*

J. Staudigel et al, A quantitative numerical model of multilayer vapor-deposited organic light emitting diodes, Journal of Applied Physics, Oct. 1, 1999, pp. 3895-3910, vol. 86, No. 7, American Institute of Physics.

K. B. Kahen, Rigorous optical modeling of multilayer organic light-emitting diode devices, Applied Physics Letters, Mar. 19, 2001, pp. 1649-1651, vol. 78, No. 12, American Institute of Physics.

Chih-Chien Lee et al, Numerical Simulation of Electrical and Optical Characteristics of Multilayer Organic Light-Emitting Devices, Japanese Journal of Applied Physics, 2004, pp. 7560-7565, vol. 42, No. 11A, The Japan Society of Applied Physics.

* cited by examiner

LIGHT EMISSION CHARACTERISTICS AND QUANTUM EFFICIENCY

| OPTICAL CHARACTERISTIC OR QUANTUM EFFICIENCY | W/O POWER FACTOR | W/ POWER FACTOR |
|---|---|---|
| LUMINANCE | 695.000 cd/m$^2$ | 632.000 cd/m$^2$ |
| CIE 1931 COLOR SPACE COORDINATES | (0.348, 0.581) | (0.348, 0.581) |
| INTERNAL QUANTUM EFFICIENCY | 7.18% | 8.87% |
| EXTERNAL QUANTUM EFFICIENCY | 1.45% | 1.32% |
| CURRENT EFFICIENCY | 6.080 cd/A | 5.530 cd/A |
| CURRENT EFFICIENCY | 15.400 lm/A | 14.000 lm/A |
| POWER EFFICIENCY | 3.840 lm/W | 3.490 lm/W |

METHOD OF AND SYSTEM FOR SIMULATING A LIGHT-EMITTING DEVICE

BACKGROUND OF THE INVENTION

1. Technical Field

The present invention relates to simulation for an optical device, and more specifically, it relates to a simulation technique for a light-emitting device including electro-optical conversion and carrier dynamics.

2. Description of the Related Art

Electroluminescent devices, which use organic or inorganic light-emitting materials and convert electrical energy into optical energy, have been known in recent years. Among these devices, organic electroluminescent devices (hereinafter referred to as organic EL devices), which use organic light-emitting materials, attract much attention in that emission wavelengths and other characteristics can be controlled by materials design of the light-emitting materials.

Simulation for such light-emitting devices is complicated when regularity cannot be estimated, for example, when the light-emitting material is an organic material or the light-emitting material is distributed in a matrix. To theoretically analyze electro-optical characteristics of a light-emitting device, various calculation models based on a classical carrier transport model used for simulation for a semiconductor device have been proposed.

For example, Staudigel et al., "A Quantitative Numerical Model of Multilayer Vapor-Deposited Organic Light Emitting Diodes", Journal of Applied Physics, Volume 86, Number 7, Page 3895, (1 Oct. 1999), (hereinafter referred to as "Staudigel et al."), calculates a distribution of excitons within a device in consideration of the carrier transport and exciton distribution. The method disclosed in Staudigel et al. calculates the intensity of outgoing light with the assumption that a refractive index in the device is uniform. Therefore, this method is applicable to a very simple model. However, for a light-emitting device that has a multilayer structure and realizes electro-optical conversion, the light-emitting device has radiative characteristics different from those in free space because of multiple reflections.

Another simulation method is proposed by Lee et al., "Numerical Simulation of Electrical and Optical Characteristics of Multilayer Organic Light-Emitting Devices" Japanese Journal of Applied Physics, Vol. 43, No. 11A, Page 7560 (Nov. 10, 2004), (hereinafter referred to as "Lee et al.") that considers multiple reflections of light in a multilayer structure. Although the method disclosed in Lee et al. considers optical multiple reflections, the method is not a rigorous optical model that calculates complex radiative characteristics of dipoles present inside an optical structure on the basis of the Maxwell theory. Therefore, the method does not support general-purpose simulation of electro-optical characteristics of a light-emitting device. In addition, the method does not consider dynamics about exciton diffusion, such as radiative and nonradiative deactivation of excitons, so the method is also insufficient in terms of accuracy of simulation.

Calculation of optical characteristics of an optical device using an optical model formulated by use of Maxwell equations is also proposed. The modeling can calculate optical characteristics correctly to some degree. However, since this modeling does not include a transport model for generation or disappearance of carriers and an exciton diffusion model, in the case of a light-emitting device, it is necessary to estimate and specify a position coordinate of a dipole in advance. Therefore, such modeling is not a flexible simulation system that consistently combines an electrical model and an optical model.

Moreover, Japanese Unexamined Patent Application Publication No. 2004-006755 (2004.1.8) discloses a simulation method for use in a semiconductor device. With this simulation method, a space in a semiconductor device is divided into mesh blocks, and current generated by carriers is calculated by formulation performed by use of potential and a carrier transport equation. The method disclosed in Publication No. 2004-006755 calculates current passing through a semiconductor layer by use of the concentration of carriers. Therefore, because conversion from electrical energy into optical energy in a light-emitting device is not considered, the method disclosed in Publication No. 2004-006755 cannot be directly applied to simulation for a light-emitting device.

SUMMARY OF THE INVENTION

The present invention provides a system and simulation method that simulate electro-optical characteristics of a light-emitting device in all processes, including carrier generation, transport, recombination, appearance of an exciton brought about by recombination of carriers, exciton diffusion and deactivation, light emission, and extraction of light outside the device in consideration of effects of the structure of the device.

One of the fundamental principles of a light-emitting device is conversion from electrical energy to optical energy. The conversion includes generation, transport, and recombination of carriers, and light emission caused by an exciton formed upon the recombination. The present invention focuses on an idea that association of efficiency of light emission toward outside of a light-emitting device caused by an exciton with power consumed by the exciton and power of light emission enables precise simulation using a reduced number of parameters.

In order to realize the above idea, a computer apparatus according to the present invention includes optical calculating means (optical calculation module) that independently calculates power of light emission extracted outside a device in a process in which the exciton is deactivated by the light emission as light extraction efficiency and power required for the light emission as a total emission power factor. Both the light extraction efficiency and the total emission power factor reflect the structure of the device and affect luminous efficiency of the device.

A result of the calculation of the optical calculation module is stored as intermediate data including a plurality of data sets in a format readable by other processing modules. The intermediate data includes a first data set (light extraction efficiency), a second data set (total emission power factor), a third data set (photometric quantity), and a fourth data set (including emission power factor for an emission to the upper hemisphere, a spectrum, and power reflection resulting from a layered structure). The total emission power factor in the intermediate data can be used to calculate the concentration of excitons in calculation of exciton diffusion. The remaining of the intermediate data can be used to calculate device characteristics of the light-emitting device.

A concentration distribution of carriers, such as holes and electrons supplied from an anode and cathode, respectively, is determined by calculation performed by transport calculating means (carrier transport calculation module). An exciton is generated by a process of recombination of carriers. A carrier recombination rate is used as an exciton formation rate. Diffusion calculating means (exciton diffusion calculation module) calculates the concentration of excitons in consideration of exciton generation, diffusion, and deactivation. In consideration of quantum spin statistics, singlet or triplet exciton generation is introduced into a diffusion equation as a generation ratio. By use of a diffusion equation in which an exciton nonradiative deactivation process is introduced as an exciton dissipation process, the concentration of excitons, $C(r)$, associated with an internal coordinate r inside a light-emitting device is calculated.

The exciton concentration $C(r)$ calculated by the exciton diffusion calculation module is further used to calculate the exciton radiative deactivation rate $U_c(r)$. The radiative deactivation rate $U_c(r)$ is used for calculation of light-emitting characteristics and quantum efficiency by device characteristics calculating means (device characteristics calculation module).

In accordance with embodiments of the present invention, the exciton radiative deactivation rate is calculated by the introduced total emission power factor, which represents power consumed by light emission by an exciton, and dynamics of exciton nonradiative deactivation. In addition, the concentration of excitons and the rate of exciton deactivation caused by the light emission are obtained by solving an exciton diffusion equation. On the basis of the radiative deactivation rate and, additionally, by using the light extraction efficiency, optical characteristics of the device can be finally calculated.

In accordance with embodiments of the present invention, light emission emitted as output light from excitons is converted into chromaticity coordinates providing a luminance and hue in a color space by use of variables that define the CIE 1931 color space, and output light from the light-emitting device is calculated as data in a dimension that allows color to be measured. Therefore, a result of the simulation is provided as a measurable device characteristic, thus enabling direct prediction of characteristics.

Furthermore, in accordance with embodiments of the present invention, generation and diffusion of carriers are calculated by Poisson's equation and a carrier diffusion equation obtained by a potential applied between electrodes. The present invention can support a finite lifetime of a light-emitting material of a light-emitting device and, by consistently introducing, in addition to radiative transition, nonradiative transition, i.e., a factor of decrease in emission quantum efficiency, into the exciton diffusion equation, the present invention can also support kinds and characteristics of the light-emitting material.

The computer apparatus according to the present invention may be constructed such that the optical calculation module to which an appropriate output capability is added is separated as an optical calculation solver for the light-emitting device. Moreover, the simulation system according to the present invention may be constructed as a network system that receives a simulation request and a selection of or inquiry for a set of parameters from a client apparatus over a network, performs simulation, and sends a result of the simulation to the client apparatus.

The computer apparatus according to the present invention may function as a data server that receives an inquiry for a set of parameters from a client apparatus, makes an inquiry for the set of parameters to a database, transmits the inquired set of parameters to the client apparatus, and performs simulation on the client apparatus using a result of the inquiry.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 9 illustrates data structures of databases managed in the simulation system.

FIG. 16 illustrates light-emitting characteristics and quantum efficiency calculated by the device characteristics calculation module in the form of a table.

DETAILED DESCRIPTION

Figure 1:
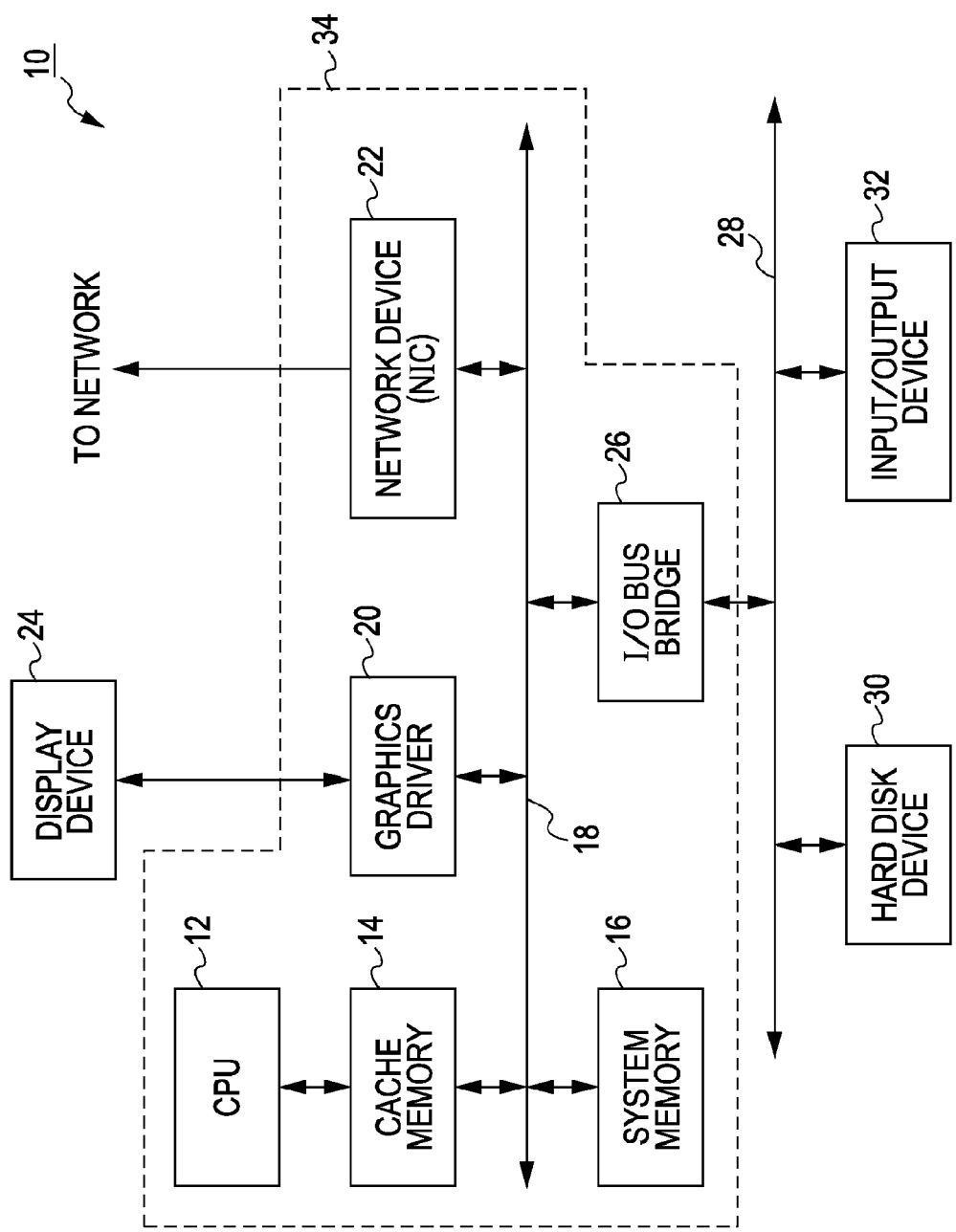
FIG. 1 illustrates a hardware configuration in a simulation system according to an embodiment.

The present invention will be further illustrated with specific embodiments below. However, the present invention is not intended to be limited to the embodiments illustrated in the drawings Section I: Hardware Configuration FIG. 1 illustrates an embodiment of a simulation system 10. The simulation system 10 is generally constructed as a computer apparatus 34. Examples of the computer apparatus 34 include a personal computer and a workstation. The computer apparatus 34 illustrated in FIG. 1 includes a central processing unit (CPU) 12, a cache memory 14 which has multiple levels of cache, such as L1 and L2, allowing high-speed access to data used by the CPU 12, and a system memory 16 formed from a solid-state memory allowing the CPU 12 to perform processing, such as random-access memory (RAM) and dynamic RAM (DRAM).

The CPU 12, the cache memory 14, and the system memory 16 are connected to other devices or drivers in the simulation system 10, for example, a graphics driver 20 and a network device (NIC) 22, via a system bus 18. The graphics driver 20 is connected to a display device 24 via a bus and can cause the display device 24 to display a result of processing performed by the CPU 12 on its display screen. The network device 22 connects the simulation system 10 to a network that uses an appropriate communication protocol, such as TCP/IP, at transport-layer and physical-layer levels.

The system bus 18 is further connected to an I/O bus bridge 26. The I/O bus bridge 26 is connected to a hard disk device 30 downstream thereof via an I/O bus 28, such as peripheral component interconnect (PCI), with integrated device electronics (IDE), advanced technology attachment (ATA), AT attachment packet interface (ATAPI), serial ATA, small computer system interface (SCSI), or universal serial bus (USB). The I/O bus 28 is connected to an input and output device 32, such as a keyboard and a pointing device (e.g., a mouse), via a bus, (e.g., USB). The input and output device 32 transmits an entry and instruction as to settings of a condition for simulation from an operator to the computer apparatus 34.

More specifically, examples of the CPU 12 of the computer apparatus 34 include CISC and RISC chips of, for example, Pentium (trademark of Intel Corporation) to Pentium 4®, Pentium®-compatible CPU, and PowerPC®.

Examples of the operating system (OS) include Mac OS™, Windows (trademark of Microsoft Corporation), Windows® 200X server, UNIX (trademark of The Open Group), AIX (trademark of IBM Corporation), LINUX (trademark of Linus Torvalds), and other appropriate operating systems. The computer apparatus 34 stores an application program operable on the above OS and described by an object-oriented programming language, such as FORTRAN, COBOL, PL/I, C, C++, Visual C++, Visual Basic, Java (trademark of Sun Microsystems), Perl, and Ruby, executes it, and thus functions as the simulation system 10.

Figure 2:
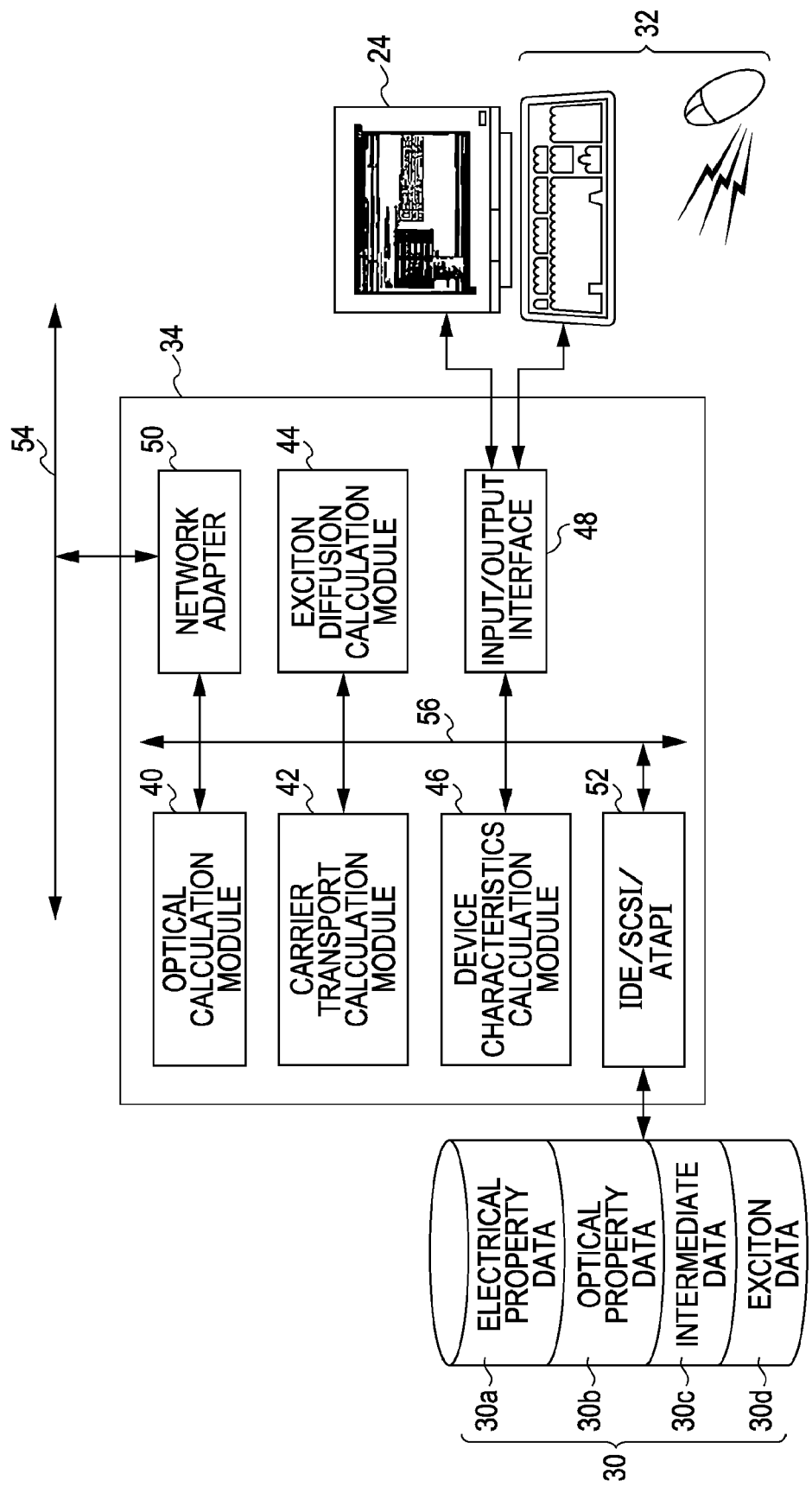
FIG. 2 illustrates calculation modules of the simulation system according to an embodiment.

FIG. 2 is a functional block diagram of the simulation system 10. Each functional means of the simulation system 10 is implemented by load of a program into the system memory 16 by the computer apparatus 34 and execution of the program by the CPU 12. In the computer apparatus 34, various settings for simulation can be performed from the input and output device 32, provided as, for example, a keyboard or pointing means (e.g., a mouse). The simulation system 10 displays a graphical user interface (GUI) for inputting the various settings on the display screen of the display device 24.

The computer apparatus 34 includes an optical calculation module 40, a carrier transport calculation module 42, and an exciton diffusion calculation module 44 to run simulation. The optical calculation module 40 performs calculation for characteristics of light emitted by excitons. The optical calculation module 40 reads optical property data from a storage area 30b in a database in the hard disk device 30 via an appropriate interface 52 (e.g., IDE, SCSI, or ATAPI) and performs calculation. The computer apparatus 34 stores a result of the calculation as a data set to be referred to as intermediate data and as a device characteristics calculation result in an appropriate storage area in the hard disk device 30 comprising electrical property data 30a, optical property data 30b, intermediate data 30c and excitation data 30d.

The carrier transport calculation module 42 calculates the concentration of carriers using information as to holes injected at an anode, electrons injected at a cathode, and a voltage applied between the anode and the cathode. The carrier transport calculation module 42 reads electrical property data stored in a storage area 30a in the database, calculates an exciton formation rate corresponding to a position within the light-emitting device, and stores a result of the calculation in a work area in the hard disk device 30. The exciton diffusion calculation module 44 calculates a space profile of the concentration of excitons using a total emission power factor calculated by the optical calculation module 40, the exciton formation rate calculated by the carrier transport calculation module 42, and exciton data stored in the database.

In addition, according to the present embodiment, the exciton diffusion calculation module 44 calculates a rate of exciton radiative deactivation caused by dipole radiation (i.e., a radiative deactivation rate $U_c(r)$) using the concentration of excitons obtained from a diffusion equation (radiative deactivation rate calculation) and transmits a result of the calculation to a device characteristics calculation module 46. The device characteristics calculation module 46 transmits the calculated device characteristics and optical characteristics to an input and output interface 48 and causes the display device 24 or a page printer (not shown) to output the characteristics. The above-described modules interconnect with each other via an internal bus 56 and perform data transmission and intercommunication, such as an interprocess communication and software interrupt.

Data referred to as the optical property data (optical data) includes data as to the structure of the light-emitting device, for example, a layer structure, layer thickness (nm), the fraction of dipoles with horizontal dipole moment, and emission quantum efficiency. Data referred to as the electrical property data (electrical data) includes carrier mobility for a material of each layer, the highest occupied molecular orbital (HOMO) energy level, the lowest unoccupied molecular orbital (LUMO) energy level, a work function of an electrode, and an applied voltage. Data referred to as the exciton data includes an exciton diffusion coefficient, D, and a spontaneous emission lifetime, $\tau_0$. Generally, when a plurality of calculation conditions is set, a plurality of values are set for at least one of parameters. As a result, for each of the three groups, a calculation condition or a plurality of calculation conditions corresponding to combinations of the parameter values are determined uniquely or as a unique set. The product of numbers of the calculation conditions assigned to the three groups is equal to the number of calculation conditions to be executed as a whole.

The simulation system 10 illustrated in FIG. 2 may control the network device 22 via a communication control functional portion provided as a network adapter 50 and be connected to a network 54, such as Ethernet® or an optical network. In the present embodiment, the simulation system 10 can be constructed as a web server or a server that provides a distribution computing infrastructure. The computer apparatus 34, which generally constitutes the simulation system 10, can receive a parameter set needed for simulation and an instruction to perform simulation from a client computer (not shown) connected to a public network, for example, the Internet, via the network 54 and obtain a parameter set from a received packet. Then, the computer apparatus 34 can perform simulation in accordance with the present invention and transmit a result of the simulation, such as optical and device characteristics, to the client computer as a response.

According to another embodiment, the simulation system 10 can receive an inquiry for a parameter set to be used in simulation from the client apparatus, search for the parameters using a SQL statement or other statements, transmit retrieved parameters to the client apparatus, cause the client terminal to execute the simulation. In this case, the computer apparatus 34 functions as a data server. In this case, it is unnecessary to update a database at the client or perform maintenance work therefor for each database updating, thus enabling efficient maintenance of simulation environment.

In the case where a request for simulation is received via the network 54, the computer apparatus 34 can provide a capability as a web server or a distributed computing server, in place of being used on a standalone basis. For this purpose, the computer apparatus 34 can be implemented as a web server that executes file transmission and reception using HTTP browser, an application server implemented by using a server program, such as common gateway interface (CGI) or servlet, and a distributed computing server that constitutes a distributed computing infrastructure, such as remote method invocation (RMI) or common object request broker architecture (CORBA).

Section II: Simulation Method

Figure 3:
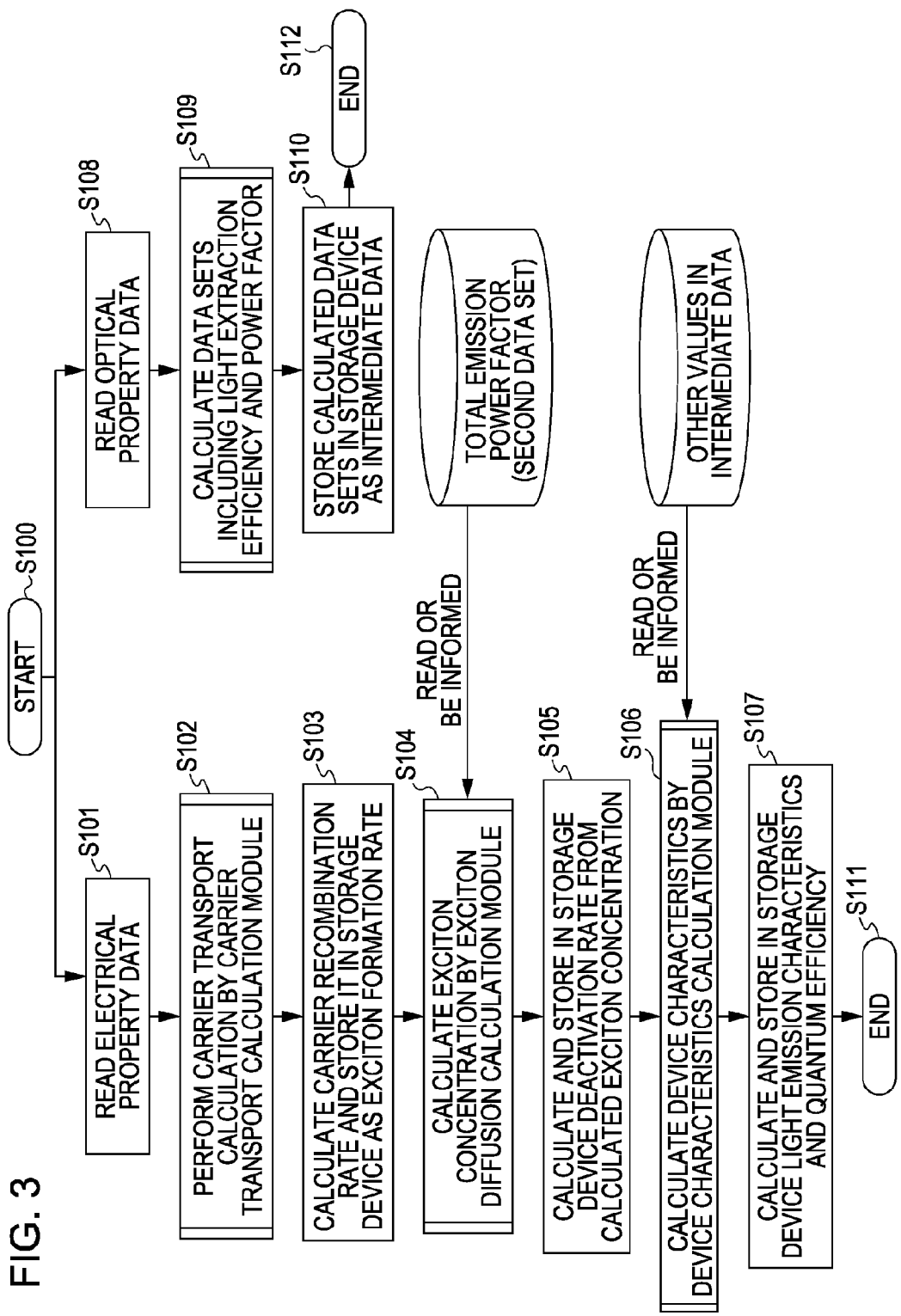
FIG. 3 is a flowchart of processing performed by the simulation system according to an embodiment.

FIG. 3 is a flowchart of processing performed by the simulation system 10 according to the present embodiment. The processing illustrated in FIG. 3 starts at step S100. In the processing illustrated in FIG. 3, steps S108 to S110 are performed by the optical calculation module 40, and the steps other than steps S108 to S110 are performed by the carrier transport calculation module 42, the exciton diffusion calculation module 44, and the device characteristics calculation module 46. According to the embodiment illustrated in FIG. 3, the optical calculation module 40 performs processing in parallel with calculations performed by other modules. However, according to another embodiment, because intermediate data including first to fourth data sets to be used by the other modules is required to be first calculated, the optical calculation module 40 can perform processing in advance of processing of the other functional modules to prepare the intermediate data.

According to still another embodiment, the optical calculation module 40 can perform calculation independently of processing of the other calculation modules, and a result of the calculation performed by the optical calculation module 40 can be stored in a storage device, such as the hard disk device 30, in a form readable by the other calculation modules. According to further another embodiment, the optical calculation module 40 can be constructed as a separate independent optical calculation solver to which a GUI or user interface that outputs only optical characteristics is added.

The processing illustrated in FIG. 3 will be further described below. In step S101, the carrier transport calculation module 42 is invoked, and electrical property data is read from the database. In step S102, carrier injection and transport are calculated by use of the read electrical property data. In step S103, a carrier recombination rate corresponding to positional data in the light-emitting device generated in the carrier transport calculation is calculated. The calculated carrier recombination rate is stored as an exciton formation rate in a storage device, such as the hard disk device 30, in a form readable by the other calculation module.

Storing data in a form readable by the other calculation modules indicates that the names of variables are the same as those for the other modules or the data is described in the same address range as that used by the other calculation modules in a manner in which an exclusive lock is not available to the data (i.e., readable). According to a specific implementation form, when the optical calculation module 40 accesses the intermediate data, the optical calculation module 40 can set an exclusive lock by using, for example, a semaphore to avoid a dirty read by the other modules. According to another embodiment, the optical calculation module 40 can be constructed as a shared library or constructed as a shared file stored in a directory or a storage area dedicated to the shared library and data therefor.

Then, in step S104, a diffusion equation formulated so as to include the exciton formation rate and the total exciton deactivation rate for the position coordinate r in the light-emitting device (for convenience of description, in one-dimensional representation, the depth z from a reference position) is solved by numerical analysis, and thus the concentration of excitons is calculated in consideration of exciton formation and deactivation dynamics. In step S105, the exciton radiative deactivation rate $U_c(r)$ is calculated, and the calculated data is stored in a storage device, such as the hard disk device 30, in a form readable by the optical calculation module 40.

In step S106, the device characteristics calculation module 46 is invoked, the intermediate data calculated by the optical calculation module 40 and data calculated by the exciton diffusion calculation module 44 are read, and the device characteristics calculation module 46 calculates device characteristics. In step S107, the calculated device characteristics are converted into data of measurable dimension as a form of light-emitting characteristics and quantum efficiency, and the data is then stored in a storage device, the hard disk device 30. In step S111, the process ends.

In step S108, the optical calculation module 40 is invoked, and the optical property data is read from the storage area 30b in the hard disk device 30. In step S109, the optical calculation module 40 calculates intermediate data containing light extraction efficiency (a first data set), total emission power factor (a second data set), photometric quantity (a third data set), and a fourth data set. The total emission power factor represents power consumed by an exciton. According to the present embodiment, the total emission power factor represents power consumed by a dipole when the exciton is deactivated by dipole radiation and, since the power increases or decreases resulting from multiple reflections in a device structure compared with radiation power in free space, the total emission power factor is defined as the rate of increase or decrease thereof In step S110, in order to allow the other modules to refer to the calculated values to calculate the concentration of excitons and device characteristics of the light-emitting device, the calculated values for the data sets included in the intermediate data are stored in a storage device, such as the hard disk device 30, so as to be readable by the other corresponding modules. In step S112, the processing ends.

The optical calculation module 40 can prepare the intermediate data before the other functional modules start their operations. According to another embodiment, a program can be implemented such that the other functional modules wait until the optical calculation module 40 ends its calculation and restart their processing upon receipt of a notification over an interprocess communication with the optical calculation module 40.

Figure 4:
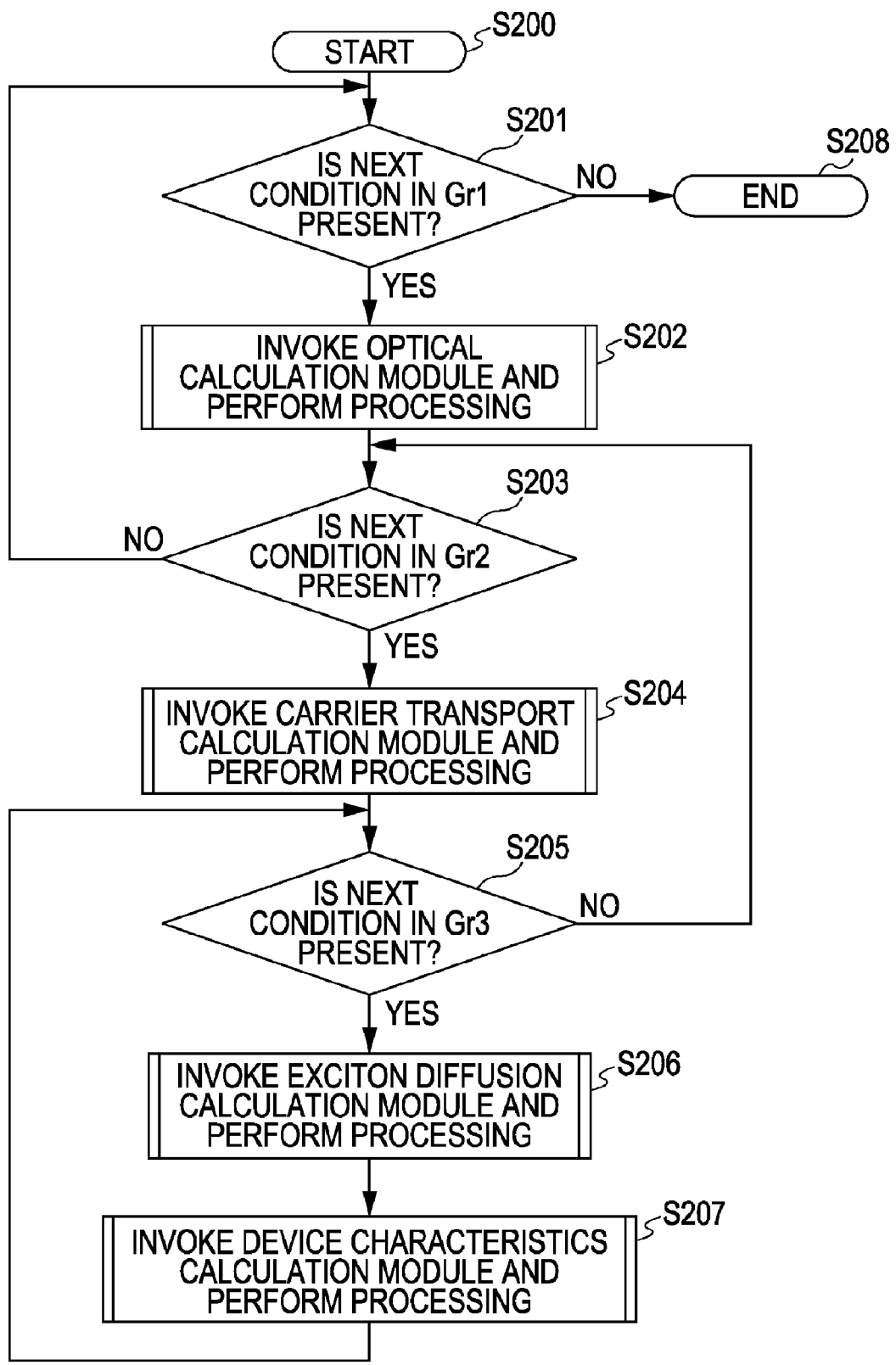
FIG. 4 is a flowchart of processing executed in the simulation system according to another embodiment.

FIG. 4 illustrates another embodiment of the simulation method. The processing illustrated in FIG. 4 can be suitably used when a plurality of conditions are specified at a time and an independent simulation is performed for each of the conditions.

The processing illustrated in FIG. 4 starts at step S200. In step S201, it is determined whether there remains a condition to calculate in a condition group Gr1 for the optical data. If calculation of all optical characteristics has been completed, flow proceeds to step S208, where the processing ends. If, in step S201, it is determined that there remains a condition to calculate in the condition group Gr1, flow proceeds to step S202. In step S202, the optical calculation module 40 is invoked and performs processing, and a calculation result is stored in association with the targeted condition in the storage device.

Then, in step S203, it is determined whether a condition to calculate in a condition group Gr2 specifying the electrical data remains. If a condition to calculate in the condition group Gr2 does not remain (NO in step S203), flow proceeds to step S201, where it is determined whether a condition to calculate in the condition group Gr1 remains. If it is determined that a condition to calculate in the condition group Gr2 remains (YES in step S203), flow proceeds to step S204. In step S204, the carrier transport calculation module 42 is invoked and performs carrier transport calculation. A result of the calculation is stored in association with (Gr1, Gr2). Then, in step S205, it is determined whether a condition to calculate in a condition group Gr3 for use in calculation of diffusion remains. If a condition to calculate in the condition group Gr3 does not remain (NO in step S205), flow proceeds to step S203, and the processing is repeated.

If, in step S205, it is determined that a condition to calculate in the condition group Gr3 remains (YES in step S205), flow proceeds to step S206, where the exciton diffusion calculation module 44 is invoked and performs calculation. In step S207, the device characteristics calculation module 46 is invoked, performs calculation, and a result of the calculation is stored as a set of values of characteristics of the light-emitting device in the storage device, the set of values being equal in number to Gr1×Gr2×Gr3.

The calculation illustrated in FIG. 4 repeats a procedure similar to calculation with a single condition illustrated in FIG. 3. However, according to the embodiment illustrated in FIG. 4, the calculation modules can be implemented so that the calculation modules do not perform their calculations for each condition, but perform calculation for only parameters other than a group of parameters that do not affect results of their calculations. That is, according to the embodiment illustrated in FIG. 4, the optical calculation module 40 extracts a single calculation condition from the condition group Gr1 and performs calculation only for the extracted condition. When a condition to calculate does not remain, the calculation processing ends.

When the optical calculation module 40 finishes calculation for a specific calculation condition, a single condition is extracted from the condition group Gr2, and the carrier transport calculation module 42 performs calculation for the extracted calculation condition. When a calculation condition does not remain, the processing returns to the optical calculation module 40. A single calculation condition is obtained from the condition group Gr1 again, and the optical calculation module 40 performs calculation for the obtained calculation condition. When the carrier transport calculation module 42 finishes calculation for the single calculation condition, the processing proceeds to the exciton diffusion calculation module 44. A single calculation condition is obtained from the condition group Gr3, and the exciton diffusion calculation module 44 performs calculation for the obtained calculation condition. Subsequently, the device characteristics calculation module 46 performs its processing. When a calculation condition in the condition group Gr3 does not remain, the processing returns to the carrier transport calculation module 42, and a single calculation condition is read from the condition group Gr2 and the carrier transport calculation module 42 performs calculation for the read condition. The processing described above enables efficient calculation for combinations of specified conditions, while at the same time suppressing a reduction in efficiency of hardware resources.

Section III: Individual Processing of Calculation Modules

III-1: Carrier Calculation Module

Processing of each of the calculation modules according to the present embodiment will now be described below. The carrier transport calculation module 42 reads electronic properties of a material of each layer being a component of the light-emitting device, determines a concentration distribution of electrons and holes corresponding to a voltage applied between electrodes, and a carrier recombination rate $U_L(r)$. The carrier recombination rate $U_L(r)$ is generally expressed in units of $1/(\text{sec}^{-3})$ and is used for calculation performed by the exciton diffusion calculation module 44, which will be described in detail below. Examples of output items of the carrier transport calculation module 42 include, in addition to the carrier recombination rate, a potential, electric field, current, and concentration distribution of electrons and holes.

In the case of a device that uses guest and host materials, generally, a Langevin recombination model is applied to an exciton formation rate for donor molecules. According to the present embodiment, with respect to an exciton in an acceptor molecule, energy transition from an exciton in a donor molecule and carrier recombination in the acceptor molecules themselves are assumed. Calculation by the carrier transport calculation module 42 uses a typical carrier transport model, and therefore, the details of the procedure thereof are omitted.

Figure 5:
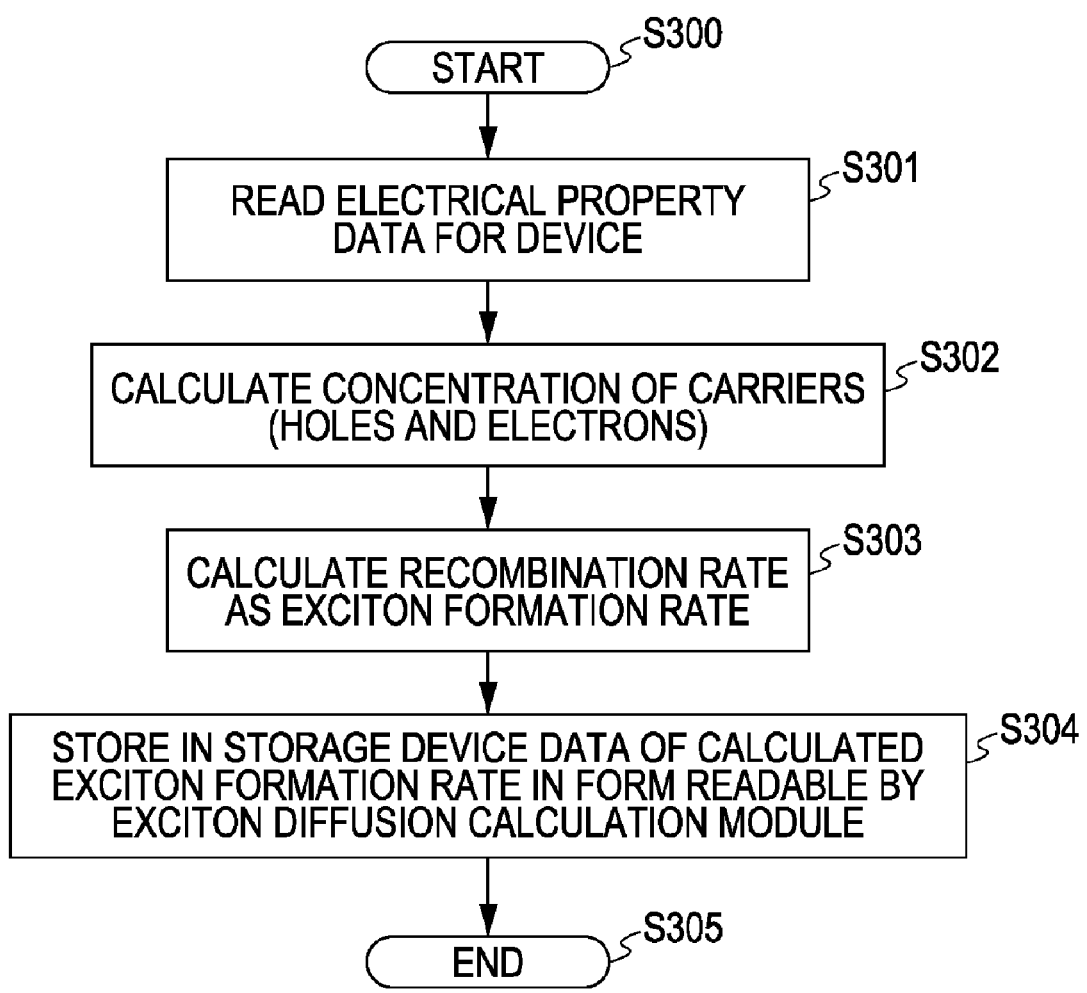
FIG. 5 is a flowchart of processing performed by a carrier transport calculation module according to an embodiment.

FIG. 5 is a flowchart of processing performed by the carrier transport calculation module 42 according to the present embodiment. The processing illustrated in FIG. 5 starts at step S300. In step S301, the electrical property data pertaining to the light-emitting device is read from the database. In step S302, the concentration of carriers (electrons and holes) is calculated. The concentration of carriers at a positional coordinate r with respect to a reference position can be calculated by use of a process of dividing the light-emitting device into unit meshes and calculating the concentration of carriers for each unit mesh.

In the processing illustrated in FIG. 5, in step S303, a carrier recombination rate at the position coordinate r is calculated. Then, in step S304, data pertaining to the calculated exciton formation rate is stored in the storage device in a form readable by the exciton diffusion calculation module 44. The data pertaining to the exciton formation rate at this stage is constructed as array data, or a matrix, in which the exciton formation rate calculated for each unit mesh is entered. The data is stored in the storage device, and the processing ends at step S305. In steps S303 and S304 in the processing illustrated in FIG. 5, the carrier recombination rate as equivalent to the exciton formation rate is stored. This enables the exciton diffusion calculation module 44 to use the exciton formation rate as the carrier recombination rate $U_L(r)$ for the position coordinate r, which will be described in detail below.

III-2: Optical Calculation Module

The optical calculation module 40 obtains optical data, such as a refractive index of each layer included in the light-emitting device and a spectral emission intensity of each exciton and calculates light extraction efficiency, a power factor which reflects an electro-optical conversion characteristic, photometric quantities, and another data set. The calculated data sets are classified into four groups described below, and calculating means for calculating each of the data sets is provided using software.

(1) Calculation of Light Extraction Efficiency

When simplified as a one-dimensional multilayer structure, the light extraction efficiency can be defined by expressions (1) below. The definition can be expanded to a three-dimensional structure by using a Cartesian coordinate system (x, y, z), a polar coordinate system, or a cylindrical coordinate system, depending on the structure of the light-emitting device.

$$\gamma_{te}(r,\lambda) = a\bar{P}_h(r,\lambda) + (1-a)\bar{P}_v(r,\lambda)$$

$$\gamma_{ue}(r,\lambda) = a\bar{P}_{he}(r,\lambda) + (1-a)\bar{P}_{ue}(r,\lambda)$$

$$\gamma_{ne}(r,\lambda) = a\bar{S}_h(r,\lambda) + (1-a)\bar{S}_v(r,\lambda) \quad (1)$$

In expressions (1), where "a" represents the fraction of dipoles whose dipole moment lies parallel to a surface (light-emitting surface) of the light-emitting device, $\hat{P}_h$, $\hat{P}_{he}$, and $\hat{S}_h$ represent respective total emission power, emission power for an emission to an upper hemisphere, and emission power for an emission in a front direction per unit solid angle with respect to a horizontal dipole, and $\hat{P}_v$, $\hat{P}_{ve}$, and $\hat{S}_v$ represent respective total emission power, emission power for an emission to the upper hemisphere, and emission power for an emission in the front direction per unit solid angle with respect to a vertical dipole. An indication "-" added directly above an alphabet letter that represents a variable in expressions (1) and formula described below can be referred to as "hat" and, in the specification, a variable normalized by use of an emission power of a dipole in free space is referred to.

Variables with "hat" are normalized by total emission power for an exciton which exists in free space. Although the position coordinate r generally represents three-dimensional coordinates, in the case of a multilayer structure, in particular, the position coordinate r represents a one-dimensional coordinate solely dependent on a depth z from an appropriate reference position.

Calculation of the light extraction efficiency deals with a significantly large amount of data because it is a function of a wavelength and a position. Therefore, the light extraction efficiency is used as internal data for calculation of the second to fourth data sets. It is basically unnecessary to output the light extraction efficiency for use in the other modules.

A radiating dipole has a dipole moment dependent on a molecular orientation of a light-emitting molecule and has radiation characteristics varying with vector orientations of the molecule. The values can be no empirically derived by use of a molecular orbital method, such as GAUSSIAN, MOPAC, GAMES, MNDO, MINDO, MINDO3, and STO-3G, and can be stored in the database. A value selected from among the previously reported measurement values and actual measured values can be stored in the database.

In practice, vector orientations of the dipole moment have a distribution specific to a light-emitting material. Characteristics unique to a light-emitting material correspond to the thickness of a layer or a method for forming the layer. As the characteristics, a previously calculated mean value of data pertaining to the dipole moment obtained from a crystal structure by X-ray diffractometry or other processes can be stored in the database. The optical calculation module 40 calculates total emission power $\gamma_{te}(r, \lambda)$, emission power for an emission to the upper hemisphere (or radiant flux to the upper hemisphere) $\gamma_{ue}(r, \lambda)$, and emission power for an emission in the front direction per unit solid angle (or radiant intensity in the front direction) $\gamma_{ne}(r, \lambda)$ using the obtained mean values. Subscripts "te", "ue", and "ne" represent "total emission", "upper emission", and "normal emission", respectively.

Figure 6:
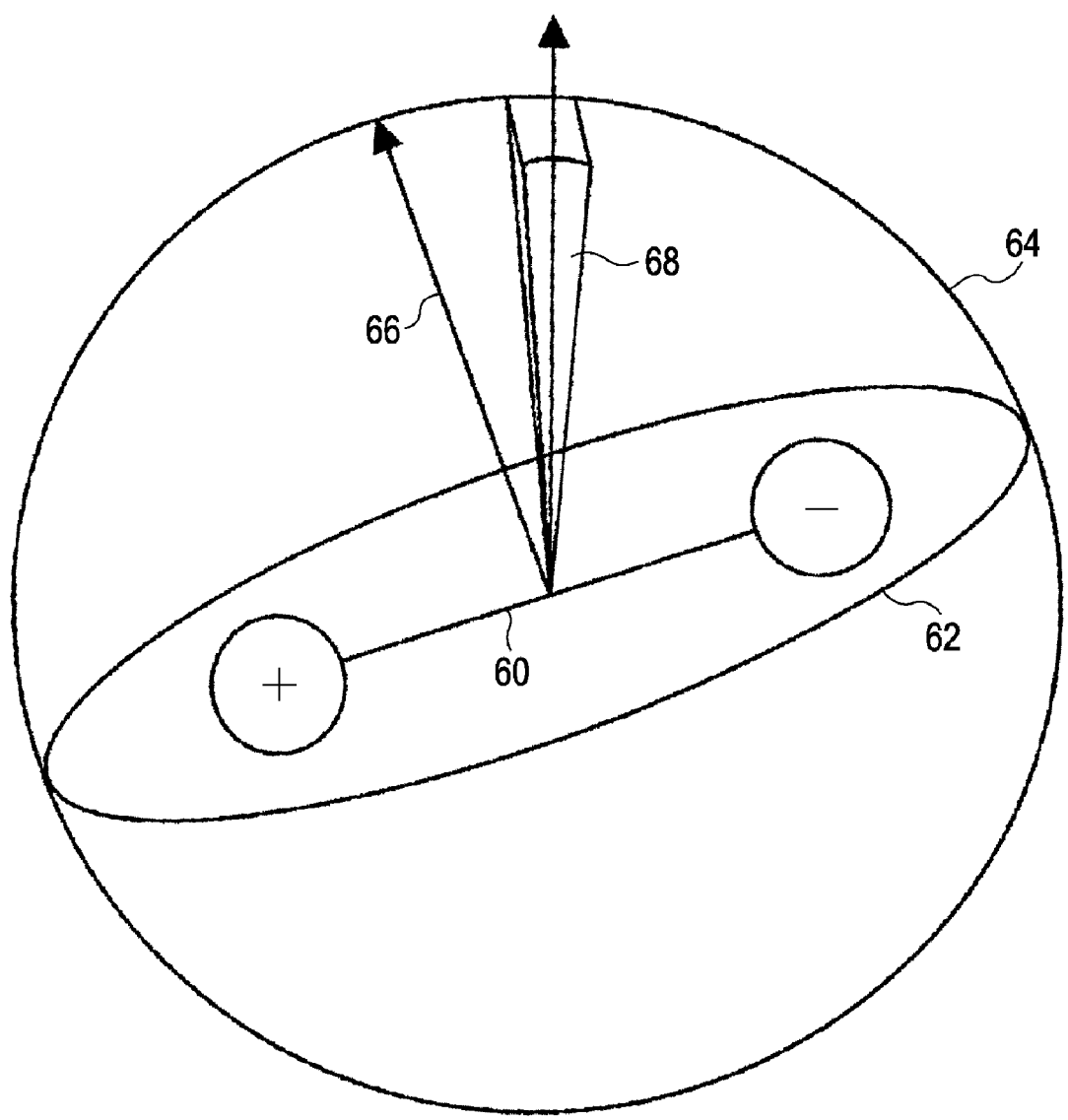
FIG. 6 is an illustration for describing a radiating dipole defined in an embodiment and definition of variables for calculating light extraction.

FIG. 6 is an illustration for describing the radiating dipole defined in the present embodiment and the definition of variables for calculating light extraction. A radiating dipole 60 is generated by electron-hole recombination and is present parallel to a plane 62. The radiating dipole 60 illustrated in FIG. 6 is slightly inclined with respect to a light-emitting surface (defined as a plane horizontal to the drawing). According to the present embodiment, the mean value of a vertical component to the light-emitting surface is calculated to obtain an emission power. The total emission power $\gamma_{te}(r, \lambda)$ is indicated by a sphere 64. The emission power for an emission to the upper hemisphere (or radiant flux to the upper hemisphere) $\gamma_{ue}(r, \lambda)$ is indicated by an arrow 66. The emission power for an emission in the front direction per unit solid angle (or radiant intensity in the front direction) $\gamma_{ne}(r, \lambda)$ represents the radiant intensity in a region indicated by a three-dimensional object 68.

Each of the above-described variables is a function of a wavelength $\lambda$ and position coordinate r and is normalized by an exciton emission power in free space. These variables are dimensionless, except that $\gamma_{nc}$ is expressed in units of 1/sr. Although the total emission power $\gamma_{te}(r, \lambda)$ includes emitted light that cannot be extracted outside the light-emitting device, this is also calculated as a parameter that provides light extraction efficiency for the sake of convenience.

(2) Calculation of Emission Power Factor

An emission power factor is a power output by a given exciton and is provided as a total emission power factor $\eta_{te}(r)$ and an emission power factor for an emission to the upper hemisphere $\eta_{ue}(r)$, which are defined as a function of only a position by equations (2) below. In accordance with expressions (2), these emission factors are obtained by evaluating a wavelength integral of light extraction efficiency $\gamma_{ue}$ and $\gamma_{te}$ in the first data set. These emission factors have the same unit as in the original light extraction efficiency. Evaluating the wavelength integral indicates integration over a wavelength range and can be realized by use of any known technique. For example, when a function to be integrated is provided as array data differenced with respect to a wavelength, the emission factors can be determined from the sum of array data.

$$\eta_{te}(r) = \int d\lambda \cdot (\gamma_{te}(r,\lambda)\bar{S}(\lambda))$$

$$\eta_{ue}(r) = \int d\lambda \cdot (\gamma_{ue}(r,\lambda)\bar{S}(\lambda)) \quad (2)$$

The total emission power factor $\eta_{te}(r)$ is stored in the second data set and is used for calculation of the concentration of excitons performed by the exciton diffusion calculation module 44. The other one of the emission power factors, i.e., the emission power factor for an emission to the upper hemisphere $\eta_{ne}(r)$ is used for calculation of optical characteristics of the light-emitting device and quantum efficiency with respect to a unit concentration of excitons performed by the device characteristics calculation module 46. The number of data is significantly smaller, compared with the light extraction efficiency, which is a function of a position coordinate and included in the first data set. In equations (2), $\hat{S}(\lambda)$ is a normalized value of an exciton spectral emission intensity $S(\lambda)$ by use of expression (3) below.

$$\overline{S}(\lambda) \equiv \frac{S(\lambda)/h\nu}{\int (S(\lambda)/h\nu)d\lambda} \quad (3)$$

(3) Calculation of Photometric Quantity

The third data set is defined as a measurable quantity for light emitted when a single exciton undergoes radiative deactivation per unit time. According to the present invention, the third data is referred to as the photometric quantity. Each of values of variables provides a physical quantity below, and the values are given by corresponding expressions (4) below.

$$I(r) \equiv k_m \int d\lambda \cdot (\gamma_{ne}(r,\lambda)h\nu\overline{S}_{ne}(\lambda)V_L(\lambda))$$

$$X \propto \int d\lambda \cdot (\gamma_{ue}(r,\lambda)h\nu\overline{S}_{ue}(\lambda)V_x(\lambda))$$

$$Y \propto \int d\lambda \cdot (\gamma_{ue}(r,\lambda)h\nu\overline{S}_{ue}(\lambda)V_Y(\lambda))$$

$$Z \propto \int d\lambda \cdot (\gamma_{ue}(r,\lambda)h\nu\overline{S}_{ue}(\lambda)V_Z(\lambda))$$

$$x(r) \equiv X/(X+Y+Z)$$

$$y(r) \equiv Y/(X+Y+Z)$$

$$\Phi(r) \equiv k_m \int d\lambda \cdot (\gamma_{ue}(r,\lambda)h\nu\overline{S}_{ue}(\lambda)V_L(\lambda)) \quad (4)$$

In expressions (4), $I(r)$ represents a luminous intensity in a front direction, $x(r)$ and $y(r)$ represent chromaticity coordinate values defined in the CIE 1931 color space (color-space coordinate values), and $\Phi(r)$ represents a total luminous flux emitted to the upper hemisphere. The unit of $I(r)$ is lm/sr·sec=cd·sec, and the unit of $\Phi(r)$ is lm·sec.

In expressions (4), $V_L$, $V_X$, $V_Y$, and $V_Z$ are spectral luminous efficacy (color-space data) and isochromatic functions defined for L, X, Y, and Z in the CIE 1931 color space, respectively, and $k_m$ is the maximum spectral luminous efficacy of 683 lm/W. Both data is managed as optical data by the database. Evaluating a wavelength integral indicates integration over each of position coordinate values and a wavelength range. Although formulation is different from the above process, another embodiment can define similar values of variables by using coordinate values in the CIE 1976 L*a*b* or L*u*v* uniform color space.

According to the present invention, the emission power is converted into a parameter that allows color to be measured by calculating coordinate values defined in a color space by use of expressions (4) and thus can be simulated. Therefore, the system according to the present invention can function as a simulator for a light-emitting device and can perform direct comparison.

A mathematical implementation technique according to the present embodiment will be described. The coordinate of depth is divided in a necessary number of unit cells, additionally, a wavelength is differenced, and numerical analysis is performed. In order to support a case in which excitons are present in different layers and a case in which excitons of different materials, such guest and host materials, are present in a single layer, a characteristic value is calculated for each exciton, and the values are added together lastly. If a luminance of the light-emitting device for a direction other than the front direction and an emission spectrum for a direction other than a viewing angle are required, light extraction efficiency $\gamma_{ne}(r, \lambda)$ is calculated for a desired angle.

(4) Calculation of Another Data Set

The fourth data set includes an exciton emission energy spectrum $S_{ne}(r, \lambda)$ defined by expression (5) below and including light extraction efficiency. The exciton emission energy spectrum $S_{ne}(r, \lambda)$ is used for calculation of a spectral radiant intensity in a front direction (having an energy dimension) performed by the device characteristics calculation module 46.

$$S_{ne}(r,\lambda) \equiv \gamma_{ne}(r,\lambda)\overline{S}(\lambda)h\nu \quad (5)$$

According to the present embodiment, an example of data added depending on a specific application is reflection loss (reflection data) caused by external light. The effects thereof are determined by calculation of power corresponding to light reflected from light in a given incident direction by use of a multilayer-structure model that uses a Fresnel coefficient. According to the present embodiment, in consideration of at least a power reflection spectrum in a front direction, calculation of reflection of the light-emitting device having a multilayer structure (multilayer characteristics calculation) is executed.

The variables $I(r)$, $x(r)$, and $y(r)$ are used by the device characteristics calculation module 46 to calculate the photometric quantity of the light-emitting device. Similarly, the variable $\Phi(r)$ is used for calculation of power efficiency. These indicate photometric quantities defined for a specific position inside the light-emitting device. According to the present embodiment, a position of an exciton that enables desired chromaticity and luminance can be identified on the basis of a result of calculation performed by the optical calculation module 40 without waiting for calculation of carrier transport or exciton diffusion. According to another embodiment, the simulation system 10 may be implemented as a solver that calculates only chromaticity and luminance, depending on a specific application.

Figure 7:
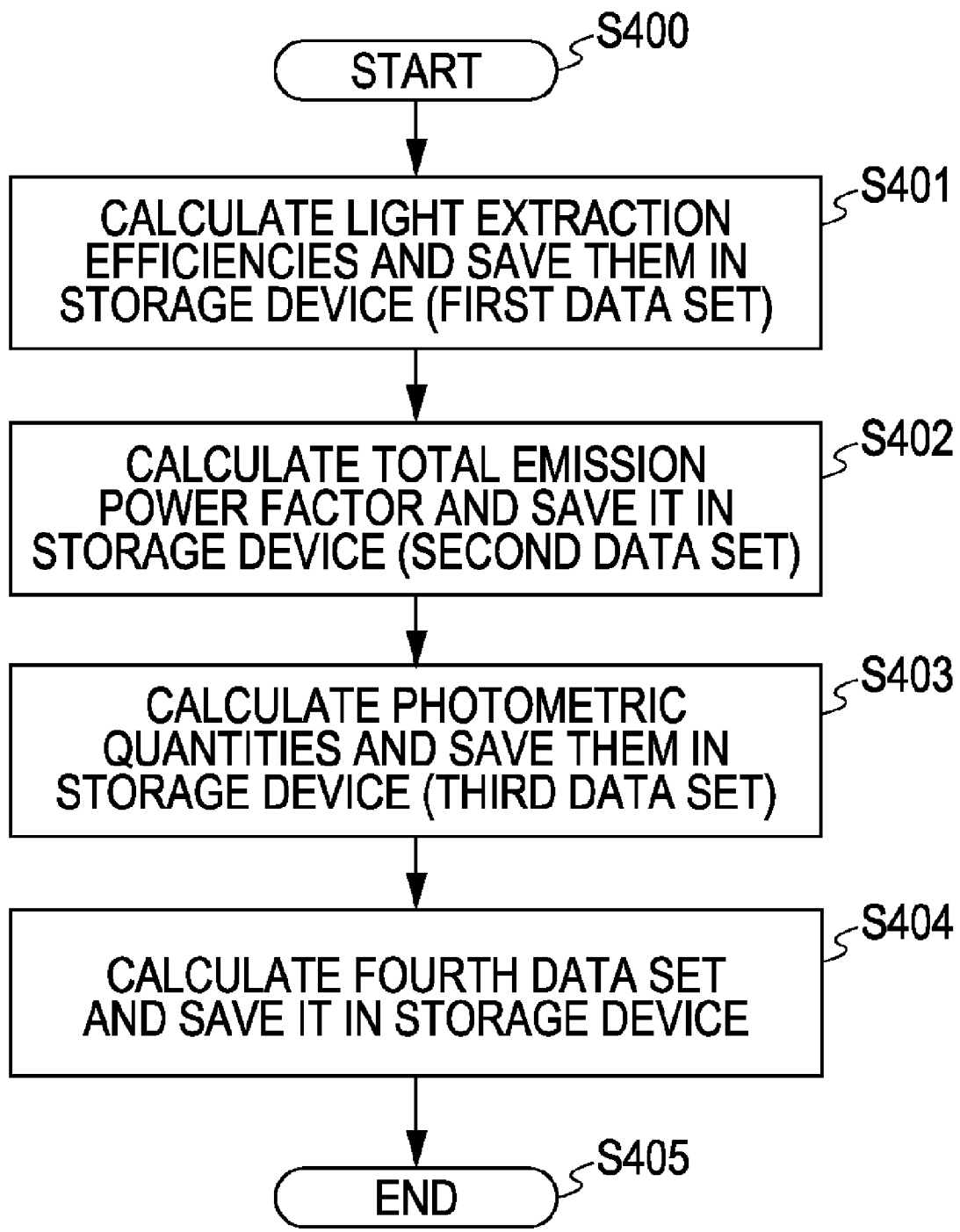
FIG. 7 is a flowchart of processing performed by an optical calculation module according to an embodiment.

FIG. 7 is a flowchart of processing performed by the optical calculation module 40 according to the present embodiment. The processing starts at step S400. In step S401, the first data set providing the light extraction efficiency is calculated using the optical property data obtained from the database. The calculated first data set is stored as intermediate data in a storage area 30c in the hard disk device 30. In step S402, the values of the second data set providing the total emission power factor are calculated and stored as intermediate data in the storage area 30c in the hard disk device 30.

Then, in step S403, the photometric quantities providing the third data set are calculated and stored as intermediate data in the storage area 30c. In step S404, the values of variables providing another data set are calculated and stored as intermediate data in the storage area 30c. In step S405, the processing ends. As previously described, the processing illustrated in FIG. 7 includes numerical analysis for a wavelength and a position coordinate r in the light-emitting device, resulting in that processing efficiency of the other modules may decrease. Therefore, the optical calculation module 40 can perform calculation while the operations of the other modules pause. Upon completion of generation of predetermined data by the optical calculation module 40, the other modules can be notified via an interprocess communication and restart their operations. Alternatively, the optical calculation module 40 can perform calculation alone in advance and a result of the calculation can be supplied to the other calculation modules.

When the simulation can use the value previously calculated by the optical calculation module 40 and stored in the database, the system can use the previously calculated stored data from the database without performing an actual new calculation of the value. This processing may preferably be applied to calculation of the light extraction efficiency, which is included in the first data set.

III-3: Exciton Diffusion Calculation Module

The exciton diffusion calculation module 44 calculates generation and deactivation of excitons using a diffusion equation. According to the present embodiment, the diffusion equation is formulated in accordance with the following expression (6).

$$\nabla \cdot (D \nabla C(r)) - \frac{C(r)}{\tau_0} \eta_{tc}(r) + \phi_{spin} U_L(r) = 0 \qquad (6)$$

In expression (6), C(r) represents the concentration of excitons at a depth x of the light-emitting device in one-dimensional representation, D represents an exciton diffusion coefficient, $\tau_0$ represents an exciton spontaneous emission lifetime, and $\Phi_{spin}$ represents a statistical probability of generation of an exciton singlet or triplet state in electron-hole recombination and is 0.25 for singlet exciton formation. The diffusion coefficient D and the exciton spontaneous emission lifetime $\tau_0$ are determined by experiment or obtained from an appropriate literature, by a molecular orbital process, or as estimated values from simulation. These values are stored in the database in advance. The carrier recombination rate $U_L(r)$ is used by reading a recombination rate calculated by the carrier transport calculation module 42.

An exciton total deactivation rate factor, $\eta_{1c}$, is defined by expression (7) below by use of the total emission power factor calculated by the optical calculation module 40, separating dissipation caused by a nonradiative transition process, and considering an increase of power consumption resulting from the structure of the light-emitting device. In expression (6) above, the exciton total deactivation rate factor is a dissipative term representing the total deactivation rate.

$$\eta_{tc}(r) = (1-q) + q \eta_{tc}(r) \qquad (7)$$

The total deactivation rate factor $\eta_{tc}$ defined in expression (7) above can be deemed to provide an effective exciton lifetime factor. By introducing the dissipative term defined in expression (7), the concentration of excitons that reflects a spatial distribution thereof can be calculated. The subscript "tc" represents "total consumption."

For example, a phenomenon is reproducible in which the effective exciton lifetime is shorter and luminous efficiency is lower to some extent than those for free space because power consumption of a radiating dipole is generally increased by cavity effects. Additionally, another phenomenon is reproducible in which the concentration of excitons is very small in only a region in the vicinity of an electrode because the effective exciton lifetime is further reduced in the vicinity of the electrode due to absorption by the electrode.

Another calculation option allows for analysis of a device characteristic from which such effects are removed, where the exciton spontaneous emission lifetime may be used with the assumption that $\eta_{te}=1$. In this case, it is necessary to select either one option before calculation. The constant q represents emission quantum efficiency and, according to the present embodiment, is assumed to be constant independently of optical effects of a cavity structure. The total deactivation rate factor $\eta_{tc}$ may be calculated in advance by the optical calculation module 40.

Next, in accordance with expression (8) below, the dissipation caused by the nonradiative transition process is removed from the total exciton deactivation rate calculated on the basis of the second term in expression (6), and the value is divided by the total emission power factor $\eta_{te}(r)$. The solution is called an exciton radiative deactivation rate $U_c(r)$.

$$U_c(r) = q \frac{C(r)}{\tau_0} \qquad (8)$$

The unit of C(r) is $1/cm^3$, and the unit of $U_c(r)$ is $1/cm^3/sec$. According to the present embodiment, the values of C(r) and $U_c(r)$ are calculated by the exciton diffusion calculation module 44, and the value of $U_c(r)$ is used as output data from the exciton diffusion calculation module 44 for calculation of optical characteristics of the light-emitting device performed by the device characteristics calculation module 46. According to another embodiment, the exciton diffusion calculation module 44 may output the value of C(r) as output data, and the device characteristics calculation module 46 may calculate the value of $U_c(r)$.

Specifically, the procedure of one-dimensional multilayer-structure calculation includes differencing the above expressions with respect to a direction of the depth z, solving the coupled difference equations by numerical analysis, and determines the concentration of excitons C(r). Other some exciton deactivation processes which may exist in excitons are not described herein for the sake of convenience. However, it is to be noted that the above can be modified to support specific applications by introducing them in the dissipative term in an appropriate form.

Figure 8:
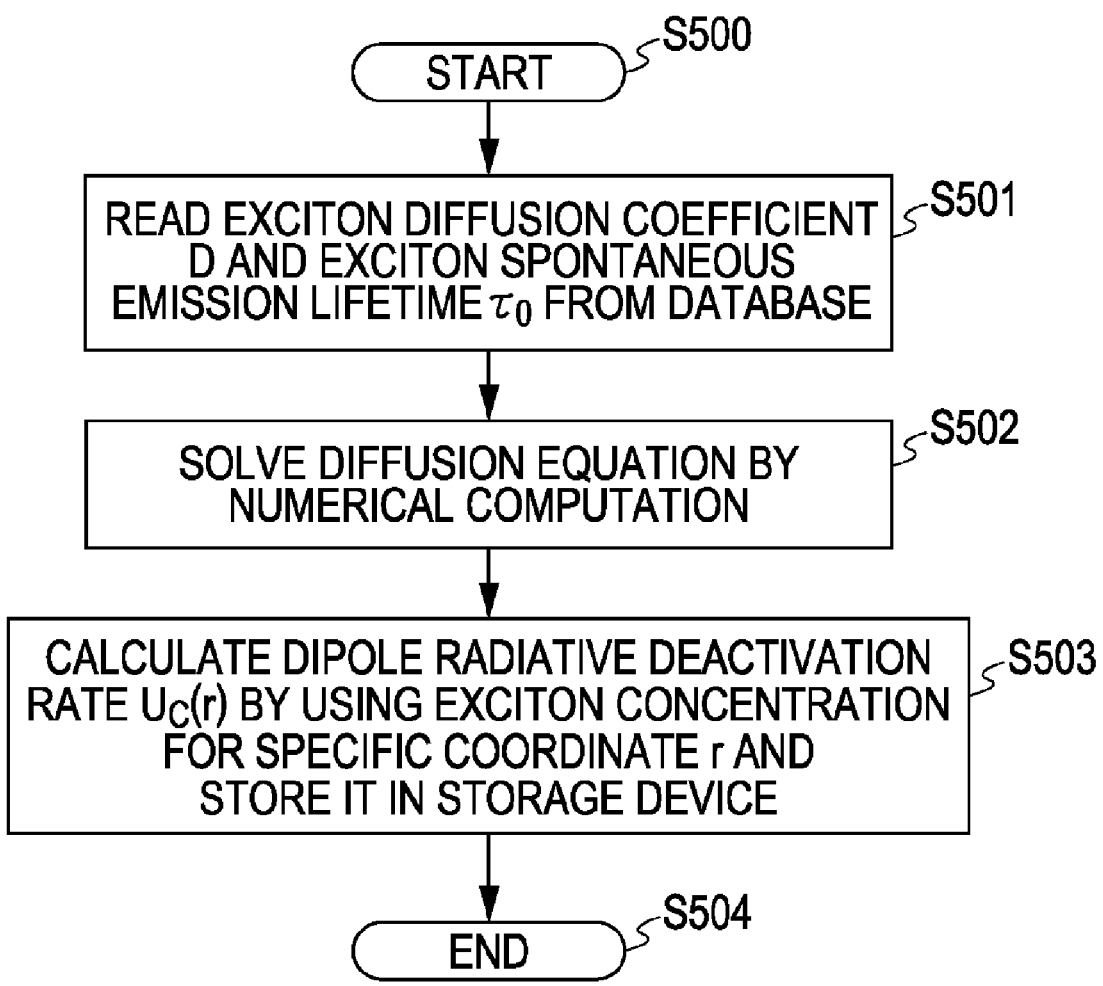
FIG. 8 is a flowchart of processing performed by an exciton diffusion calculation module according to an embodiment.

FIG. 8 is a flowchart of processing performed by the exciton diffusion calculation module 44 according to the present embodiment. The processing illustrated in FIG. 8 starts at step S500. In step S501, the exciton diffusion coefficient D and the exciton spontaneous emission lifetime $\tau_0$ are read from the database. In step S502, the diffusion equation formulated in expression (6) is differenced and solved using a solver formulated as coupled differential equations to calculate the value of C(r).

In step S503, with respect to the concentration of excitons obtained for a specific coordinate r, the value of $U_c(r)$ is calculated and stored as array data in a form readable by the device characteristics calculation module 46, which will described in detail below. In step S504, the processing ends.

III-4: Device Characteristics Calculation Module

The device characteristics calculation module 46 integrates items output from the optical calculation module 40 with respect to the depth z using the radiative deactivation rate $U_c(r)$ calculated by the optical calculation module 40 and the exciton diffusion calculation module 44 to calculate characteristics of the light-emitting device, including light-emitting characteristics and quantum efficiency of the light-emitting device. According to another embodiment, the value of $U_c(r)$ may be calculated not by the exciton diffusion calculation module 44 but by the device characteristics calculation module 46 prior to calculation of the light-emitting characteristics and quantum efficiency.

Calculation of light-emitting characteristics and quantum efficiency will now be described below.

(1) Light-Emitting Characteristics

The light-emitting characteristics are calculated using expressions (9) below. That is, the light-emitting characteristics are calculated with respect to light emitted in a front direction of the light-emitting device.

$$W = \int dz \cdot (\gamma_{ne}(r,\lambda) h \nu \overline{S}_{ne}(\lambda) U_c(r))$$

$$L = \int dz \cdot (l(r) U_c(r))$$

$$x = \int dz \cdot (x(r)l(r)U_c(r))/L$$

$$y = \int dz \cdot (y(r)l(r)U_c(r))/L$$

$$E = \int dz \cdot (\Phi(r)U_c(r)) \quad (9)$$

In expression (9), W represents a radiant intensity in a front direction (total luminous flux), L represents a luminance in the front direction, x and y represent chromaticity coordinates defined in the CIE 1931 color space, and E represents a luminous flux per unit area. The unit of W is W/sr/m²/nm. The unit of L is cd/m². The unit of E is lm/m². Further, h represents a Planck's constant, ν is a frequency of emitted light, and radiative deactivation rate $U_c(r)$ is an exciton radiative deactivation rate.

According to the present embodiment, quantum efficiency is also calculated. The quantum efficiency are provided as internal quantum efficiency $\Gamma_{int}$, external quantum efficiency $\Gamma_{ext}$, current efficiency $\Gamma_{CE}$, and power efficiency $\Gamma_{PE}$, which are calculated using expressions (10) below. The internal quantum efficiency $\Gamma_{int}$ and the external quantum efficiency $\Gamma_{ext}$ are dimensionless. The current efficiency $\Gamma_{CE}$ and power efficiency $\theta_{PE}$ are expressed in cd/A and lm/W, respectively, in a dimension that allows color to be measured. The internal quantum efficiency $\Gamma_{int}$ corresponds to quantum efficiency in electro-optical conversion inside the light-emitting device. The external quantum efficiency $\Gamma_{ext}$ is the value of a variable that corresponds to quantum efficiency for light emitted outside the light-emitting device from among light emission generated by electro-optical conversion.

$$\Gamma_{int} = \int dz \cdot (\eta_{te}(r)U_e(r))/j$$

$$\Gamma_{ext} = \int dz \cdot (\eta_{ue}(r)U_e(r))/j$$

$$\Gamma_{CE} = L/j$$

$$\Gamma_{PE} = E/j\phi \quad (10)$$

In expressions (10), j represents a load current density to the light-emitting device and φ represents an applied voltage to the light-emitting device.

When the device characteristics calculation module 46 is invoked, since the values of $\lambda_{ne}(r, \lambda)$, I(r), $\eta_{te}(r)$, $\eta_{ue}(r)$, and $U_c(r)$ at the position coordinate r per unit have been previously stored in the hard disk device as array data sets associated with the position coordinate r (in one-dimensional formulation, depth z), expressions (9) and (10) are calculated by a numerical computation of retrieving relevant data from the array data sets and summing them. The light-emitting characteristics and quantum efficiency calculated by the device characteristics calculation module 46 function as measurable values for the light-emitting device and thus provides electro-optical characteristics of the light-emitting device by direct simulation. This can significantly increase efficiency of design of the light-emitting device. According to the present embodiment, a simulation result can be associated with a characteristic of performance of a light-emitting device. Therefore, the simulation system having higher reliability can be provided.

Figure 9:
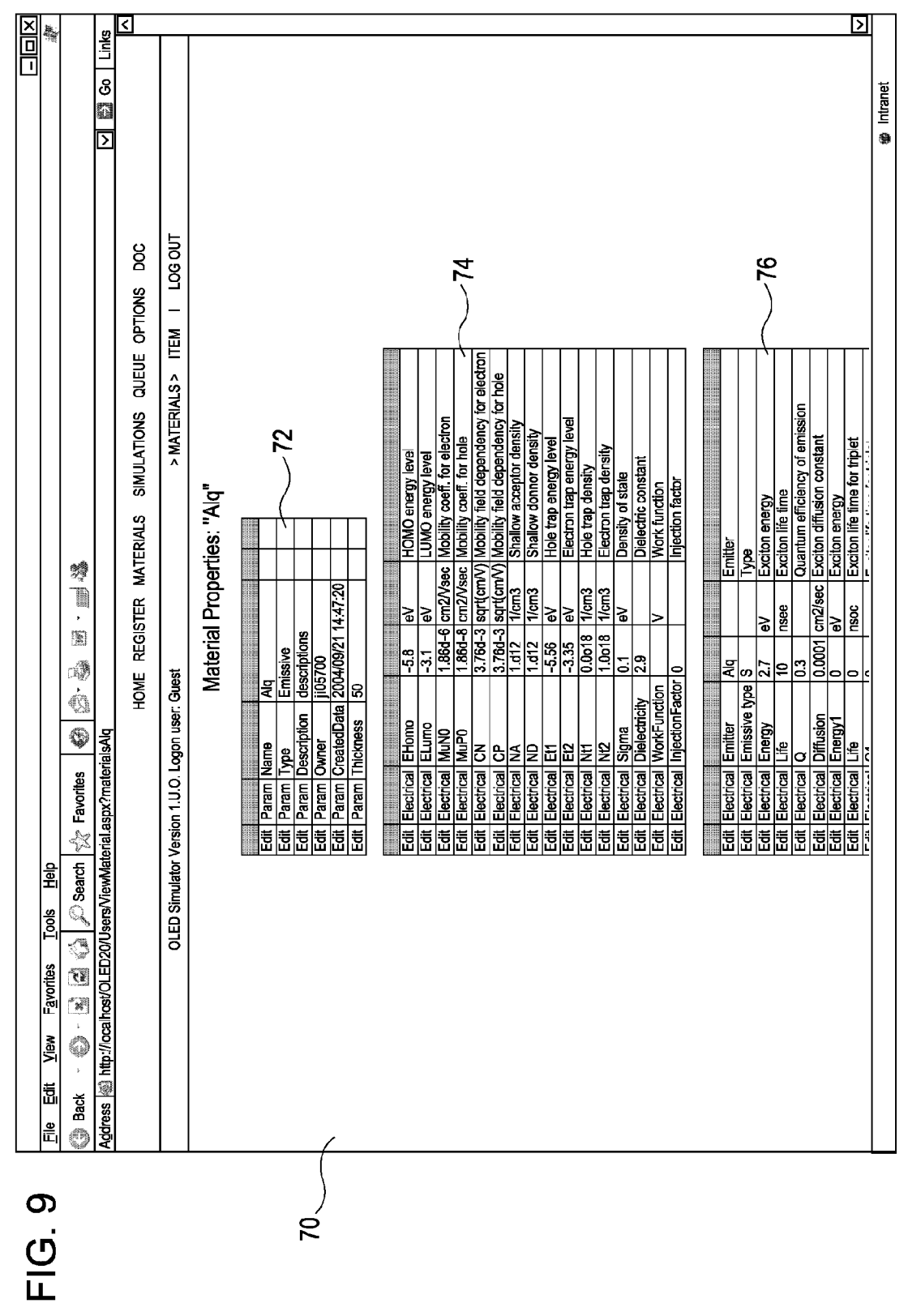

FIG. 9 illustrates data structures of databases managed in the simulation system 10. As illustrated in FIG. 9, the simulation system 10 provides a GUI 70. The simulation system 10 displays an item of data entered by an operator through the GUI 70. The operator may input a new item of data to support a specific application through the GUI 70, which is illustrated in FIG. 9.

As illustrated in FIG. 9, bibliographic information and a portion of an optical database (bibliographic information and optical database) 72 managing bibliographic information and optical data (e.g., a layer structure of a light-emitting device and a light-emitting material), an electrical database 74 managing electrical data, and exciton database 76 managing exciton data unique to an exciton. The bibliographic information and optical database 72 has entries including optical characteristics, such as an operation mode (Type), a light-emitting material (Name), a layer thickness (Thickness), and a layer structure.

The electrical database 74 has data entries including HOMO and LUMO energy levels, electron mobility, hole mobility, dependence of the electron mobility and hole mobility on electric filed, acceptor density, donor density, electron trap energy level, hole trap energy level, hole trap density, electron trap density, density of states, permittivity, work function of an electrode material, and injection efficiency. The exciton database 76 has entries including a light-emitting material, operation mode, exciton energy level, and values of an exciton emission lifetime ($\tau_o$), quantum efficiency of light emission, and diffusion coefficient (D).

The computer apparatus 34 constituting the simulation system 10 invokes the modules and causes the modules to read data necessary for processing from the databases and to execute the processing. The databases 72, 74, and 76 can be constructed as relational databases. In this case, the computer apparatus 34 can support query, such as a structured English query language (SQL) statement, at execution of the processing and can use a process of making an inquiry about data corresponding to settings from an operator (user) to the databases and storing the data in a format readable by the modules in the system memory 16.

When the simulation system 10 is connected to a client apparatus via a network, the simulation system 10 may receive a query from the client apparatus via the network, transmit data sets to the client apparatus as a response to the query, and cause the client apparatus to perform simulation.

Figure 10:
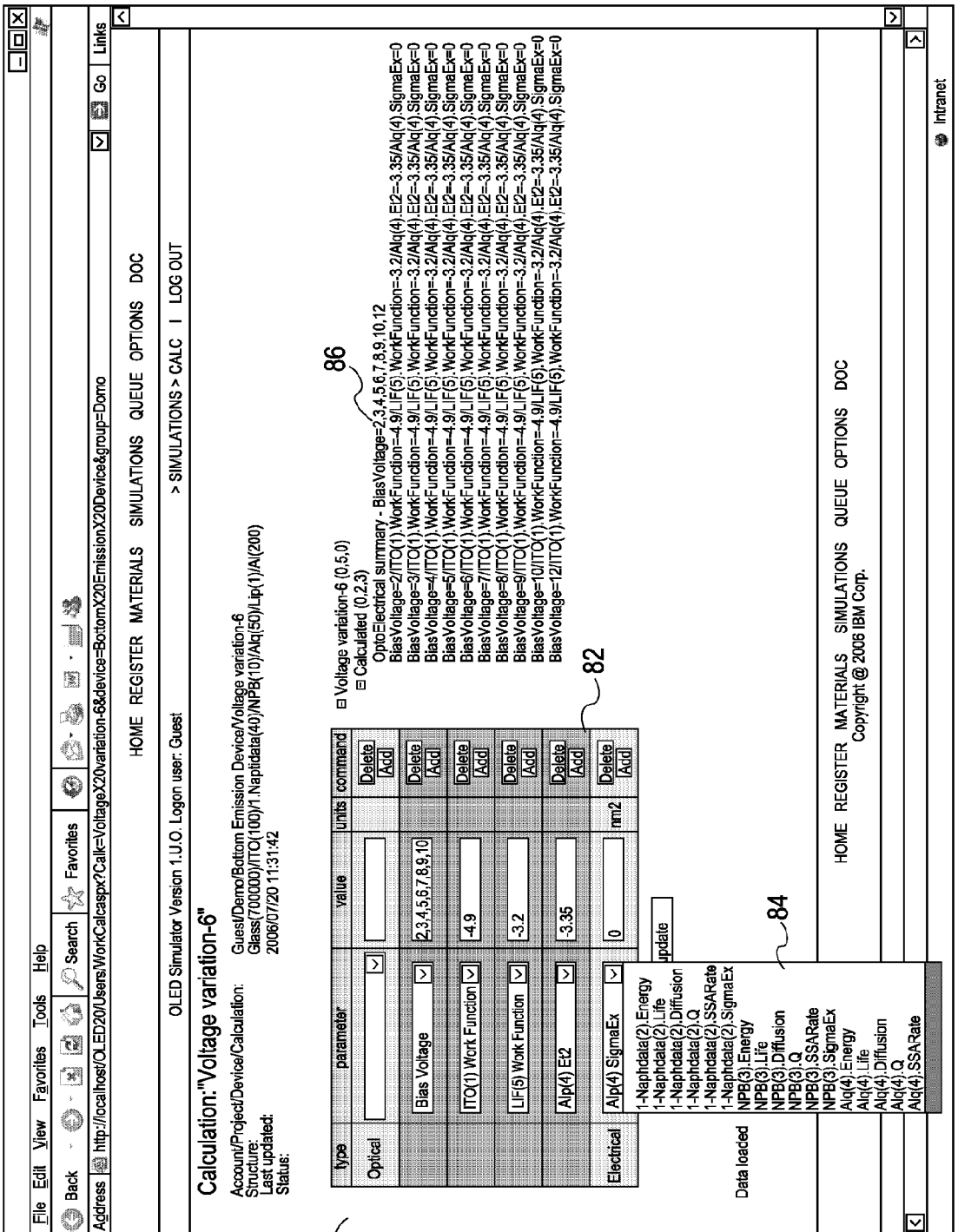
FIG. 10 illustrates a GUI displayed on a display device by the simulation system according to an embodiment.

FIG. 10 illustrates a GUI displayed on the display device 24 by the simulation system 10 according to another embodiment. A GUI 80 illustrated in FIG. 10 is displayed when an operator specifies a condition for use in simulation. The GUI 80, illustrated in FIG. 10, displays condition fields 82. The operator can directly input data in the condition fields 82 and also can select an entry item from among preset conditions. In FIG. 10, a list box 84 drops down from an input field that allows the operator to specify a kind of a light-emitting material, thus enabling the operator to select an item as the light-emitting material. When the operator positions a mouse cursor in an input field right to the list box 84 and activates the input field after selecting the light-emitting material, the operator can input a numerical value.

In FIG. 10, a display field 86 for displaying a specified condition is displayed. That is, in response to an input by the operator, a specified condition is displayed. According to the embodiment illustrated in FIG. 10, the operator will perform simulation using a plurality of conditions, so the plurality of conditions is displayed.

When the simulation system 10 is a stand-alone system, the computer apparatus 34 can display the GUI 80, illustrated in FIG. 10, on the display device 24. When the simulation system 10 is connected to a network and the computer apparatus 34 is a web server or a server that supports distributed computing, such CORBA, the GUI 80, illustrated in FIG. 10, may be displayed on a client apparatus as a form created using a structured document, such as HTML or XML.

Section IV: Examples

Specific examples of simulation for a light-emitting device performed using the simulation system 10 according to the present invention will be described below. However, the present invention is not intended to be limited by these examples described below.

IV-1: Light-Emitting Device

A program realizing the simulation system 10 described above on a computer apparatus was created. A result of simulation executed by the program was compared with actually measured characteristics of a generated light-emitting device, and the simulation system 10 was evaluated.

Figure 11:
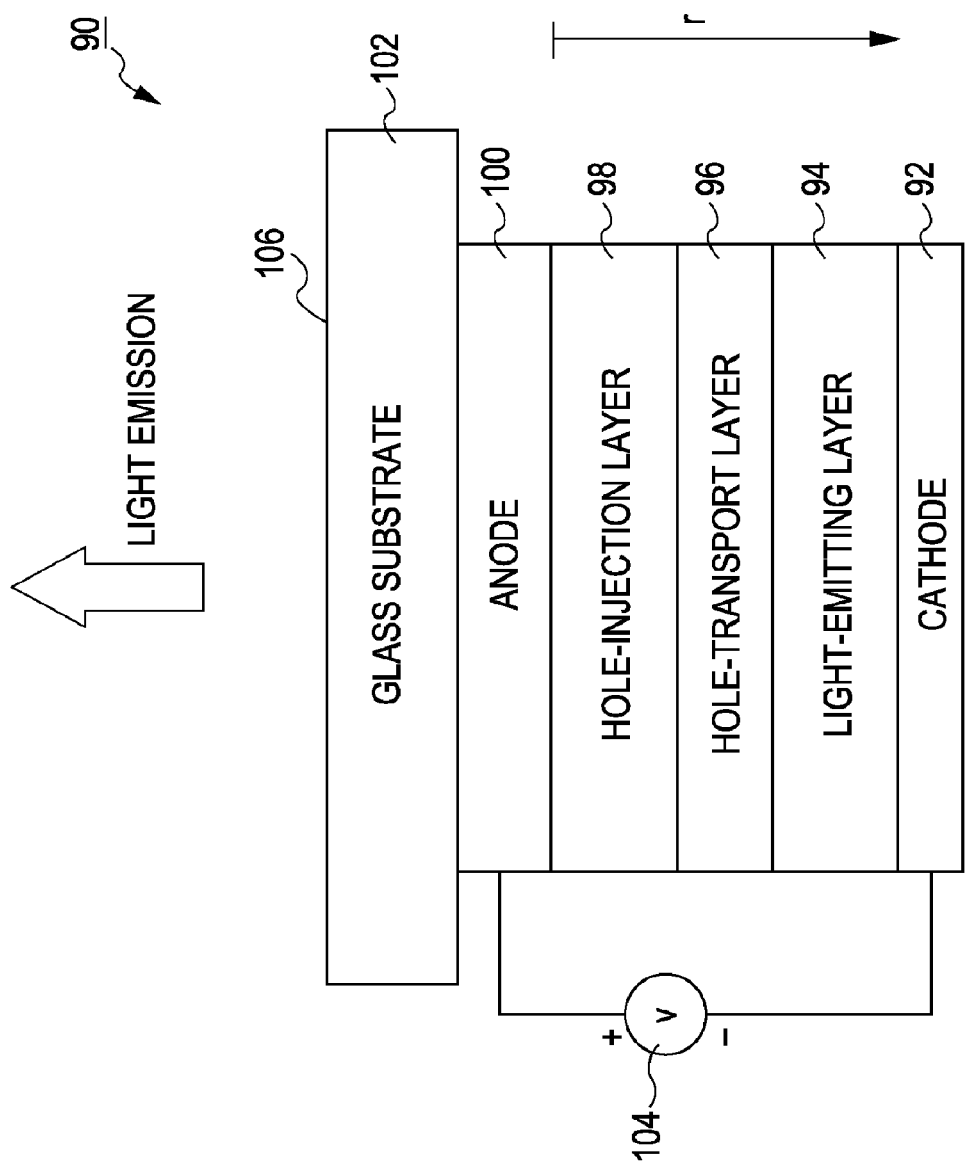
FIG. 11 illustrates a light-emitting device according to an embodiment.

The light-emitting device was constructed as an organic EL device. FIG. 11 illustrates the structure of a generated organic EL light-emitting device 90. The organic EL light-emitting device 90 was formed by sequentially depositing, on a conductive glass substrate 102, an anode (ITO) 100, a hole-injection layer 98, a hole-transport layer 96, a light-emitting layer (Alq) 94, and a cathode (LiF) 92 and has a structure of ITO/I-Naphdata (4,4',4"A-tis-[N-(1-Naphthyl)-N-(phenylamino)]triphenylamine) (40 nm)/NPB (N',N"-dis-(naphtha-lene-1-nyl)-N,N'-diphenylbenzidine) (10 nm)/Alq (tris(8-hydroxyquinoline)aluminum) (50 nm)/LiF, in which 1-Naphdata corresponds to the hole-injection layer 98, NPB corresponds to the hole-transport layer 96, Alq corresponds to the light-emitting layer 94, which is also an electron-transporting layer. A voltage was applied to the organic EL light-emitting device 90, which has a structure illustrated in FIG. 11, from an external power supply 104, and light-emitting characteristics and quantum efficiency of the organic EL light-emitting device 90 were simulated and measured. As light emission from the organic EL light-emitting device 90, light emitted upwardly from a light-emitting surface 106 in FIG. 11 was measured.

Physical values for electrons and excitons used in calculation were retrieved from those for a device that has a similar structure disclosed in Staudigel et al. Actually measured values obtained for the organic EL device described above were used as optical data and quantum efficiency.

IV-2: Simulation Results (1) Optical Characteristics

Figure 12:
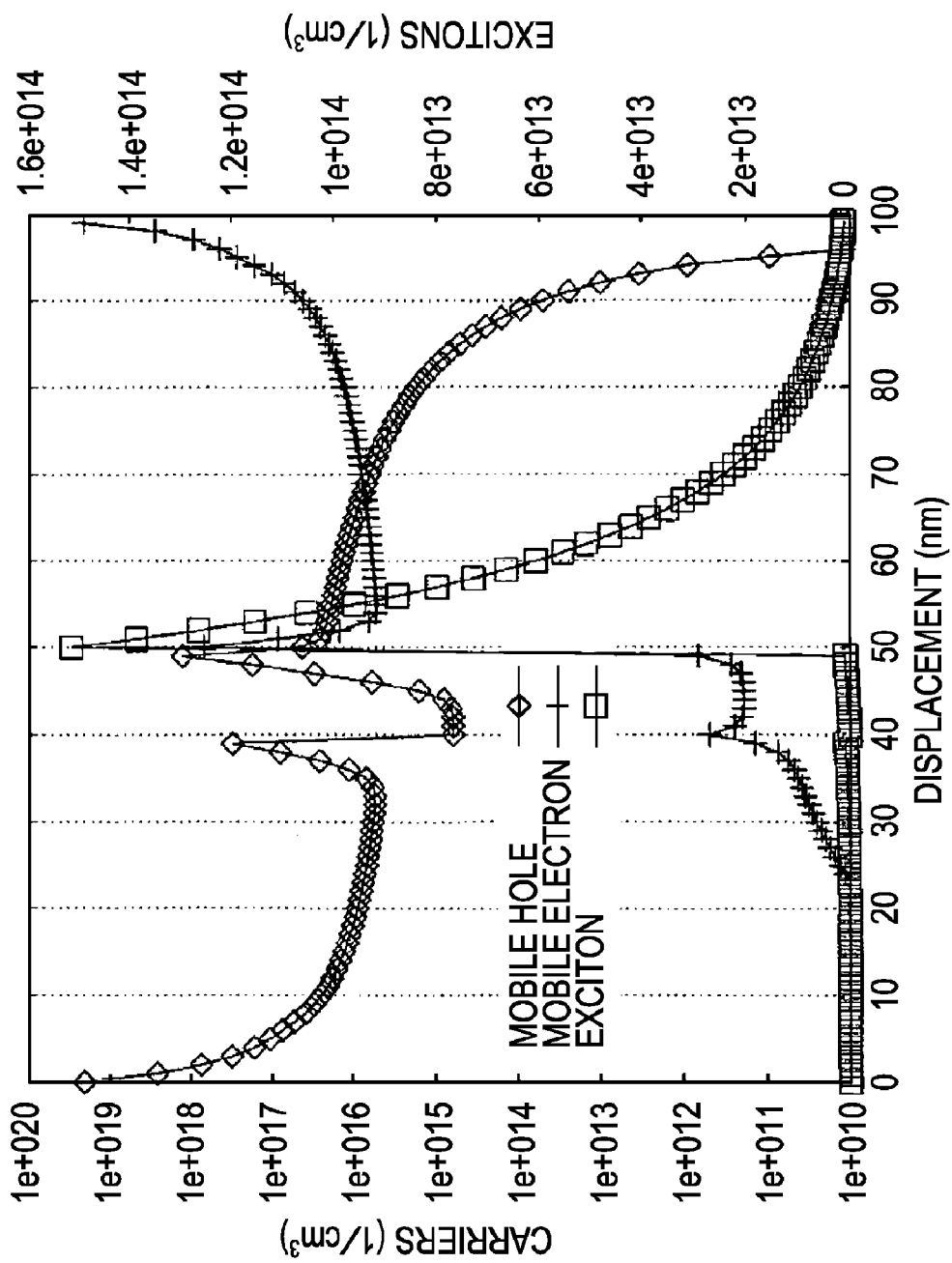
FIG. 12 illustrates a result of plotting the concentration of carriers (holes: open diamonds, electrons: plus signs) calculated by the carrier transport calculation module and the concentration of excitons (open squares) calculated by the exciton diffusion calculation module with respect to depth (displacement) from an anode interface.

FIG. 12 illustrates a result of plotting the concentration of carriers (holes: open diamonds, electrons: plus signs) calculated by the carrier transport calculation module 42 and the concentration of excitons (open squares) calculated by the exciton diffusion calculation module 44 with respect to depth (displacement) from an anode interface. As illustrated in FIG. 12, the concentration of excitons were calculated using, as an effective exciton lifetime factor, the total deactivation rate factor $\eta_{tc}(r)$ calculated from the total emission power factor $\eta_{te}(r)$ output from the optical calculation module 40 according to expression (7). The concentration of excitons illustrated in FIG. 12 is converted into the exciton radiative deactivation rate, and, by using it, the device characteristics calculation module 46 performs final processing. As illustrated in FIG. 12, at an interface between the hole-transporting layer 96 and the light-emitting layer 94, hole-electron recombination occurs, and thus the concentration of excitons is maximum.

Figure 13:
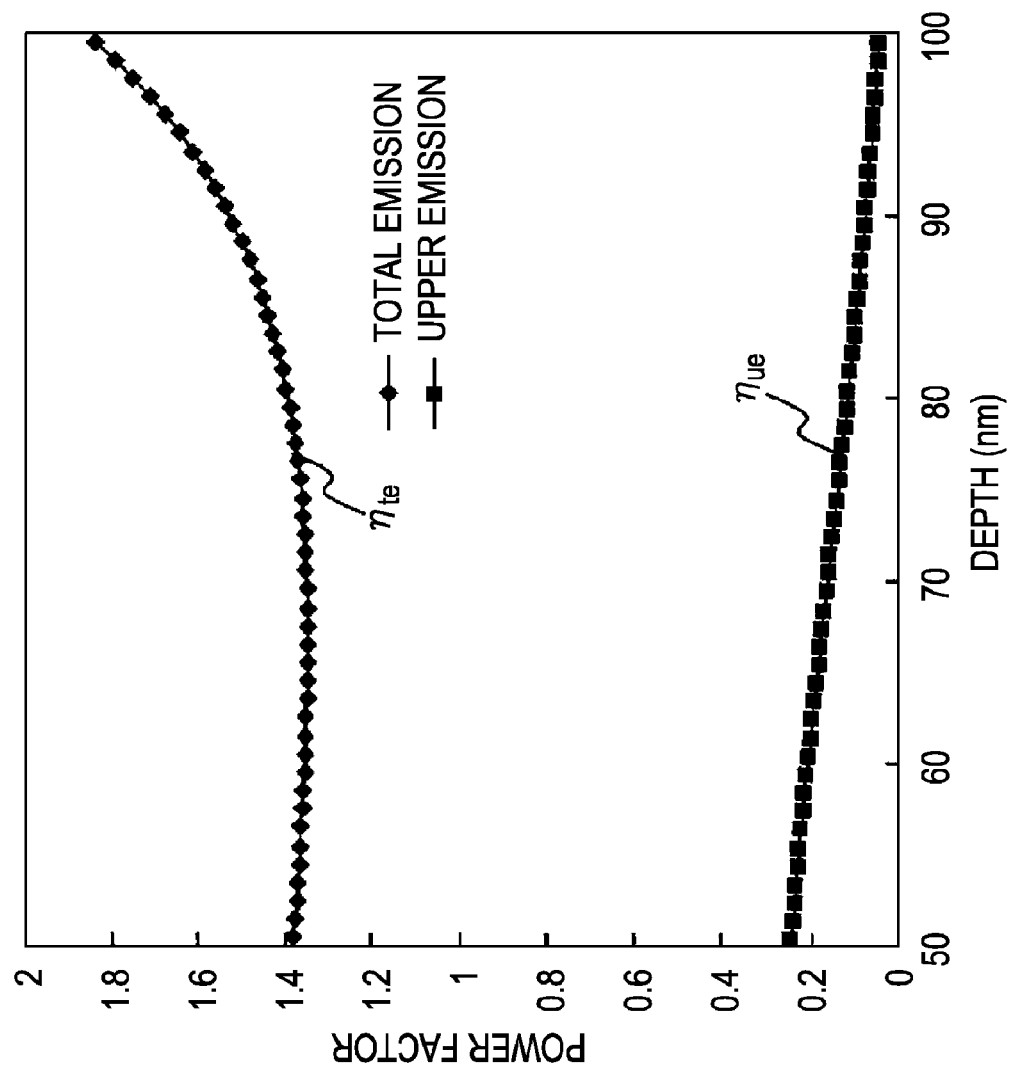
FIG. 13 illustrates a plot of the total emission power factor $\eta_{te}(r)$, indicated by solid diamonds, and the emission power factor for an emission to an upper hemisphere $\eta_{ue}(r)$, indicated by solid squares, from among intermediate data calculated by the optical calculation module with respect to a depth coordinate where excitons exist.

FIG. 13 illustrates a plot of the total emission power factor $\eta_{te}(r)$, indicated by solid diamonds, and the emission power factor for an emission to the upper hemisphere $\eta_{ue}(r)$, indicated by solid squares, from among intermediate data calculated by the optical calculation module 40 with respect to a depth coordinate where excitons exist. The plot illustrated in FIG. 13 illustrates values of the convolution integral of the light outcoupling (extraction) efficiency and the radiation spectrum and illustrates the light outcoupling (extraction) efficiency as a function of only the depth. The total deactivation rate factor $\eta_{tc}(r)$ including loss in a nonradiative transition nonradiative deactivation process can be calculated from the total emission power factor $\eta_{te}(r)$ illustrated in FIG. 13. As illustrated in FIG. 13, for excitons adjacent to the cathode, the total emission power factor $\eta_{te}(r)$ is larger.

The emission power factor for an emission to the upper hemisphere $\eta_{ue}(r)$, which represents emission to the upper hemisphere, and emission power is larger toward an NPB interface (corresponding to a depth of approximately 50 nm). As illustrated in FIG. 13, by examining the plot illustrated in FIG. 13, efficiency from the viewpoint of both emission to the upper hemisphere and total emission power can be directly recognized.

Figure 14:
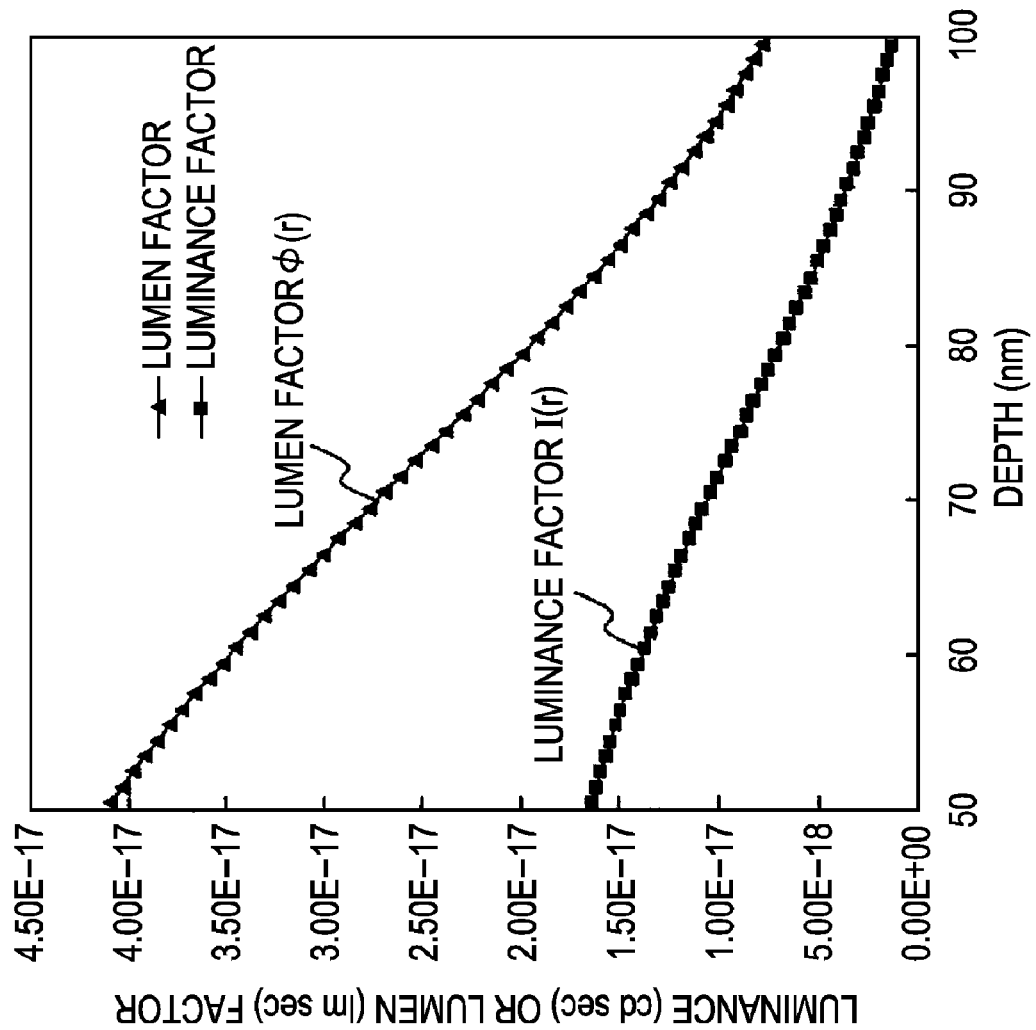
FIG. 14 illustrates a plot of the luminous intensity in a front direction $I(r)$, indicated by solid squares, and the luminous flux $\phi(r)$, indicated by solid triangles, from among intermediate data calculated by the optical calculation module with respect to a depth coordinate for light emitted when a single exciton undergoes radiant deactivation per unit time.

FIG. 14 illustrates a plot of the luminous intensity in a front direction I(r), indicated by solid squares, and the luminous flux φ(r), indicated by solid triangles, from among intermediate data calculated by the optical calculation module 40 with respect to a depth coordinate for light emitted when a single exciton undergoes radiant deactivation per unit time, analogous to FIG. 13. From the plot illustrated in FIG. 14, as in the case of FIG. 13, the luminance in the front direction and luminous flux to the upper hemisphere corresponding to the depth of an exciton can be recognized.

Figure 15:
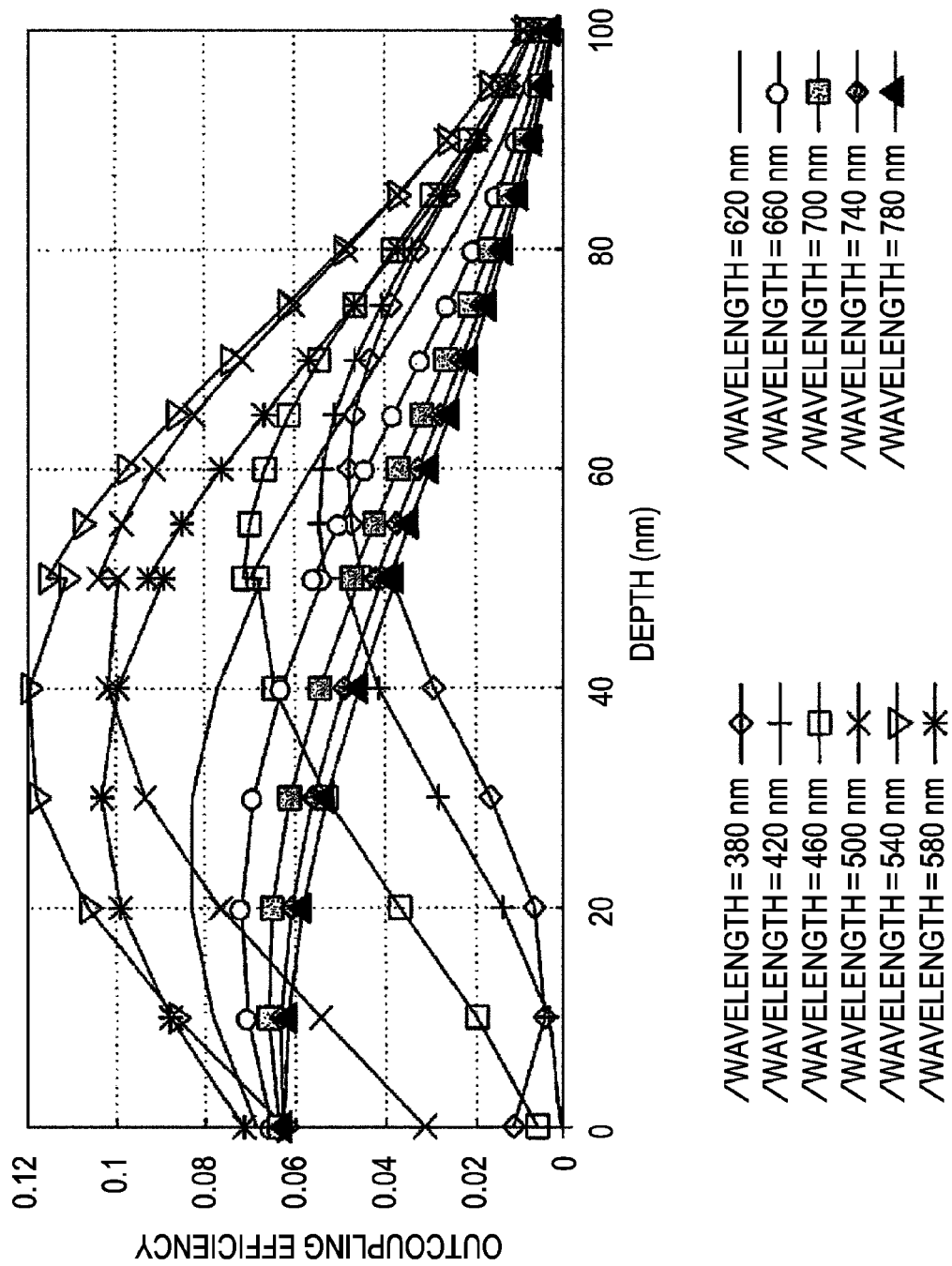
FIG. 15 illustrates a plot in which, from among the light outcoupling (extraction) efficiency calculated by the optical calculation module, the emission power for an emission in a front direction per unit solid angle $\gamma_{ne}(r, \lambda)$ is plotted using a wavelength as a parameter with respect to the depth as the horizontal axis.

FIG. 15 illustrates a plot in which, from among the light extraction efficiency calculated by the optical calculation module 40, the emission power for an emission in a front direction per unit solid angle $\gamma_{ne}(r, \lambda)$ is plotted using a wavelength as a parameter with respect to the depth as the horizontal axis. As illustrated in FIG. 15, as the wavelength is longer, the peak position of the emission power $\gamma_{ne}(r, \lambda)$ is positioned more leftward. In addition, FIG. 15 indicates that the depth of a position of exciton formation is preferably smaller and that, when the peak wavelength of emitted light for a light-emitting material is longer, the depth of an interface between the hole-transporting layer 96 and the light-emitting layer 94 is preferably adjusted.

(2) Light-Emitting Characteristics and Quantum Efficiency

Effects of the total emission power factor calculated by the optical calculation module 40 to the light-emitting characteristics and quantum efficiency calculated by the device characteristics calculation module 46 are discussed below. FIG. 16 illustrates the light-emitting characteristics and quantum efficiency calculated by the device characteristics calculation module 46 in the form of a table. The simulation was performed on the conditions that the structure illustrated in FIG. 11 was used and the applied voltage was 4 V. As a result of the simulation, the current density supplied to the organic EL light-emitting device 90 was 11.2 mA/cm².

As illustrated in FIG. 16, the luminance and the external quantum efficiency with consideration of the exciton total emission power factor by the exciton diffusion calculation module 44 is smaller by approximately 10% than those without consideration of the total emission power factor. The reduction approximately corresponds to the difference between the values of total deactivation rate factor $\eta_{tc}(r)$. The internal quantum efficiency without consideration of the exciton total emission power factor is smaller by approximately 19% than that with consideration of the exciton total emission power factor because of an assumption of $\eta_{te}(r)=1$, as described for the dissipative term in the diffusion equation. The chromaticity coordinates defined in the CIE 1931 color space (corresponding to hue) are the same in both cases. Therefore, the optical calculation module 40 can be provided as a solver that calculates optical characteristics depending on specific applications which do not require the exciton total emission power factor.

Figure 17:
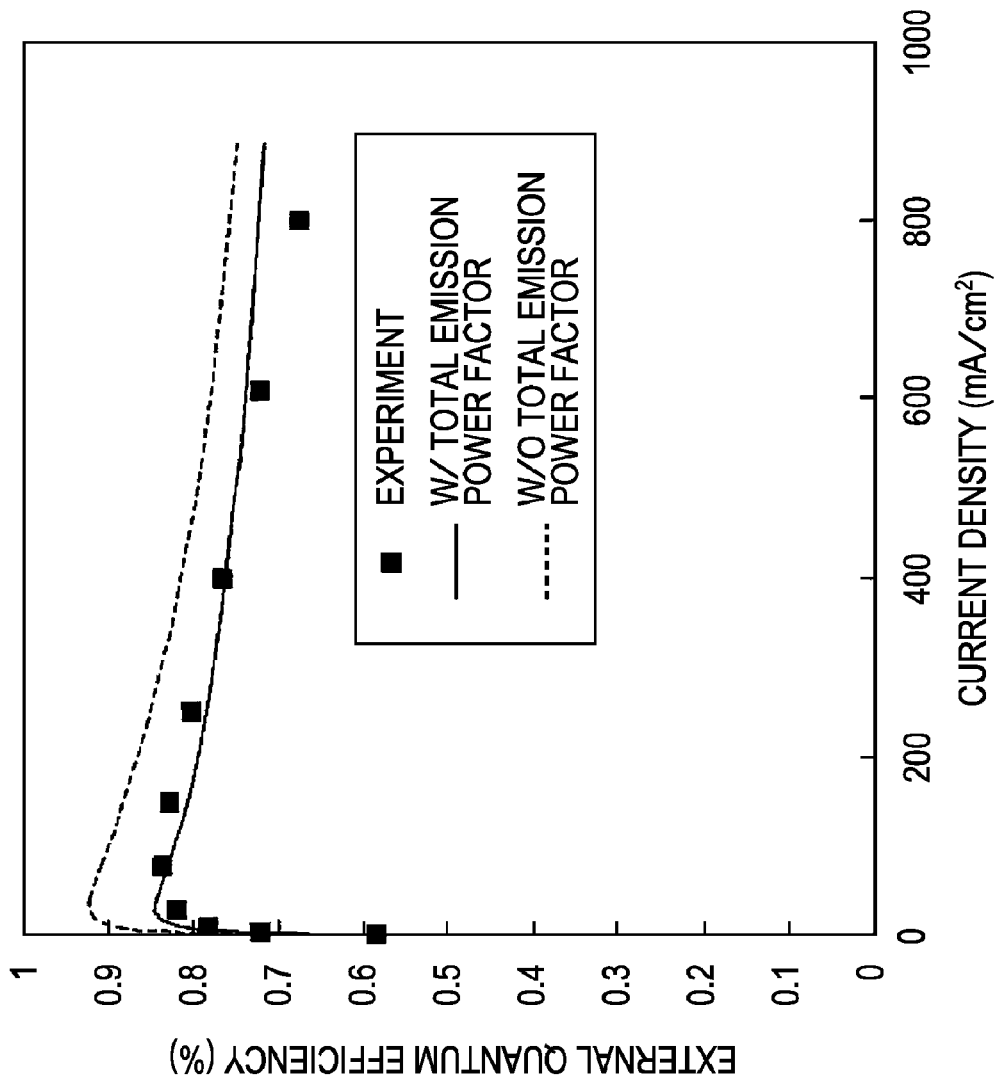
FIG. 17 illustrates a plot against the current density of the values of external quantum efficiency obtained by actual measurement and the simulation system.

FIG. 17 illustrates a plot against the current density of both the measured luminance efficiency of the light-emitting device illustrated in FIG. 11 and the external quantum efficiency calculated in the case where a voltage is set in the simulation system 10 such that the same current density is provided. The vertical axis represents the external quantum efficiency (%), and the horizontal axis represents the current density (mA/cm$^2$). In FIG. 17, the experimental values are indicated by solid squares, the results of simulation with consideration of the total emission power factor is indicated by solid lines, and the results of simulation without consideration of the total emission power factor is indicated by broken lines.

As illustrated in FIG. 17, the simulation system 10 according to the present embodiment reproduced the actually measured values by experiment within approximately a difference of 5% in a range of from low to high current density. Therefore, prediction of characteristics is excellent. In the case of simulation without consideration of the total emission power factor, indicated by broken lines, the difference between the results of the simulation and the experimental values is approximately 11%. Accordingly, simulation in consideration of the total emission power factor can simulate characteristics of light for a light-emitting device more precisely.

As described above, according to the present embodiment, the carrier recombination rate dependent on the position calculated by the carrier transport calculation module is regarded as the exciton formation rate in the exciton diffusion model, and the exciton total emission power factor dependent on the position obtained by the optical calculation module is introduced in the exciton total deactivation rate factor calculated by the exciton diffusion calculation module. Therefore, device characteristics and quantum efficiency that reflect optical effects caused by a multilayer structure can be calculated.

According to the present invention, when a plurality of calculation conditions are to be used, a user interface that facilitates condition settings can be provided by grouping parameters for use in calculation into an optical calculation module, carrier transport calculation module, and exciton diffusion calculation module, and efficient calculation free of overlap can be performed.

In addition, according to the present invention, the optical calculation module calculates the emission power factor and photometric quantity in association with an internal coordinate in the light-emitting device, and a result of the calculation by the optical calculation module can be referred to by a user. Therefore, without performance of the carrier transport calculation module and the exciton diffusion calculation module, the light-emitting characteristics of an exciton at any point inside the light-emitting device can be quickly estimated. Although the simulation system described above uses a device that contains organic molecules by way of example, the present invention is applicable to a light-emitting device in which an emission process and a nonradiative process compete with each other, such as that containing inorganic molecules or a crystal.

The simulation system according to the present invention is provided by implementation of each functional module by loading a computer-executable program into a computer apparatus. The program may be a program described by a legacy programming language or an object-oriented programming language. Examples of the programming language include FORTRAN, COBOL, PL/I, C, C++, Java®, Java® Beans, Java® Applet, Java® Script, Perl, and Ruby. The computer-executable program can be stored in installable storage media, and the media can be distributed.

While the present invention has been described with reference to the embodiments illustrated in the drawings, it is to be understood that the invention is not limited to these embodiments. Other embodiments, additions, changes, and deletions could be made within a range that could be easily reached by those skilled in the art and are included in the scope of the present invention as long as the operations and advantages of the present invention are achieved.

The invention claimed is:

1. A method of simulating a plurality of characteristics of a light-emitting device, executed on a computer device, comprising:

calculating a plurality of data sets using the computer device including a first data set comprising a light extraction efficiency, a second data set comprising a total emission power factor of excitons, a third data set comprising a photometric quantity and a fourth dataset comprisinq an emission power factor and a power reflector;

storing said plurality of data sets in a first storage device;

calculating a concentration of carriers in the light-emitting device using the computer device and for storing a carrier recombination rate as an exciton formation rate in a second storage device;

reading the exciton formation rate and the second data set calculating using the computer device a concentration of excitons using a total deactivation speed of an exciton; and calculating, using the computer device, and displaying on a display device, device characteristics of the light-emitting device in a measurable dimension by using a data set, selected from the plurality of data sets other than the second data set and an emission deactivation rate, calculated from the concentration of excitons;

wherein calculating said first data set comprises calculating the light extraction efficiency as a function of a wavelength and a position, the light extraction efficiency responsive to a fraction of dipoles from a plurality of dipoles having a moment parallel to a light-emitting surface;

wherein calculating said second data set comprises evaluating a wavelength integral of a light extraction efficiency;

wherein calculating said third data set comprises calculating a photometric quantity using a luminous intensity in a front direction and a total luminous flux emitted; and wherein calculating said fourth data set comprises calculating an exciton emission energy spectrum responsive to a reflection loss caused by external light by determining a power corresponding to an amount of light reflected in an incident direction using a Fresnel coefficient.

2. The simulation method as claimed in claim 1, wherein the calculating the concentration of excitons includes:

reading the total emission power factor stored in the storage device;

performing a numerical analysis of simultaneous differential equations including the exciton formation rate speed to calculate the concentration of excitons; and associating the concentration of excitons with the position coordinates within the light-emitting; and storing results of said associating, as matrix data in the storage device, in order to calculate the emission deactivation rate of excitons.

3. The simulation method according to claim 1, wherein the step for calculating the concentration of excitons includes calculating the concentration of excitons using a quantum efficiency when the excitons undergo a nonradiative deactivation.

* * * * *